US007826172B2

(12) United States Patent
Inata et al.

(10) Patent No.: US 7,826,172 B2
(45) Date of Patent: Nov. 2, 2010

(54) READ/WRITE DISK APPARATUS HAVING A MECHANISM FOR PIVOTING CARTRIDGE STORAGE PORTIONS WHICH ENCLOSE THE DISK THEREBY ALLOWING ACCESS TO THE DISK

(75) Inventors: Masahiro Inata, Hyogo (JP); Teruyuki Takizawa, Osaka (JP); Kozo Ezawa, Osaka (JP)

(73) Assignee: Panasonic Corporation, Osaka (JP)

( * ) Notice: Subject to any disclaimer, the term of this patent is extended or adjusted under 35 U.S.C. 154(b) by 580 days.

(21) Appl. No.: 11/872,074

(22) Filed: Oct. 15, 2007

(65) Prior Publication Data

US 2008/0088970 A1    Apr. 17, 2008

(30) Foreign Application Priority Data

Oct. 16, 2006    (JP)    ............................. 2006-281083

(51) Int. Cl.
*G11B 17/08*    (2006.01)
(52) U.S. Cl. .................. 360/98.06; 360/99.06; 720/643
(58) Field of Classification Search ......... 720/643–644; 360/99.04–99.06, 99.02, 99.03, 99.07
See application file for complete search history.

(56) References Cited

U.S. PATENT DOCUMENTS

| 4,992,896 | A | * | 2/1991 | Inoue et al. | ............... | 360/99.06 |
| 5,640,288 | A | * | 6/1997 | Horie | ...................... | 360/98.04 |
| 6,728,201 | B2 | * | 4/2004 | Takizawa et al. | ............ | 720/738 |

FOREIGN PATENT DOCUMENTS

JP    09-153264    6/1997

OTHER PUBLICATIONS

International Application No. PCT/JP2007/059444 (cited in [0056], p. 17 of the specification), Filed on Apr. 2006.

* cited by examiner

*Primary Examiner*—A. J. Heinz
(74) *Attorney, Agent, or Firm*—Renner, Otto, Boisselle & Sklar, LLP

(57) ABSTRACT

A disk apparatus compatible with a disk cartridge having a large head window even with a small external size.

A disk apparatus includes a cartridge holder, a pair of guide walls, a disk motor, a head, a base, first and second slider guides, first and second open/close sliders respectively having first and second engageable portions. The slider guides are provided in the cartridge holder for supporting the disk cartridge, and the sliders are slidably engaged with the slider guides. The sliders slide to allow the engageable portions to be engaged with the disk cartridge such that a distance between the engageable portions is smaller than a distance between the guide walls while the disk cartridge is inserted, and such that the distance between the engageable portions is larger than the distance between the guide walls when the disk cartridge is mounted, and thus form a window in the disk cartridge so as to allow the head to access the disk and allow the disk to be mounted on the disk motor.

13 Claims, 24 Drawing Sheets

READ/WRITE DISK APPARATUS HAVING A MECHANISM FOR PIVOTING CARTRIDGE STORAGE PORTIONS WHICH ENCLOSE THE DISK THEREBY ALLOWING ACCESS TO THE DISK

BACKGROUND OF THE INVENTION

1. Field of the Invention

The present invention relates to a disk apparatus for write data on, and/or read data from, a disk cartridge enclosing a disk-type data storage medium such as an optical disk or a magnetic disk.

2. Description of the Related Art

Disk-type data storage mediums have already been widely spread in the society, for example, CDs, DVDs and the like usable for writing or reading with an optical beam, flexible disks and the like usable for writing or reading with a magnetic force, and MOs, MDs and the like usable for writing or reading with an optical beam and a magnetic force. Especially rewritable mediums such as DVD-RAMs, MOs and the like are stored in a cartridge shown in, for example, Japanese Laid-Open Patent Publication No. 9-153264 for protecting the data stored thereon. Herein, the term "disk cartridge" refers to a cartridge enclosing a disk-type data storage medium.

FIG. 24 schematically shows a structure of a disk cartridge disclosed in Japanese Laid-Open Patent Publication No. 9-153264. As shown in FIG. 24, a disk cartridge 100 encloses a rewritable disk 10 and includes a support base 101 acting as an external housing.

The support base 101 has a window 101w each in a top surface and a bottom surface for allowing means for rotating the disk 10 such as a disk motor and means for performing data writing and/or reading to enter the support base 101 and approach the disk 10.

The support base 101 also has an inner wall for positioning the center of the disk 10 and rotatably holding the disk 10 while saving a clearance for the disk 10.

The disk cartridge 100 includes a shutter 103 folded in a C shape for covering the windows 101w formed in the top surface and the bottom surface and holding the support base 101 to protect surfaces of the disk 10 exposed to the windows 101w.

The shutter 103 is capable of translating in the direction represented with arrow P shown in FIG. 24, and is loaded by a spring in the direction of closing the windows 101w. In this manner, the disk cartridge 100 is structured so as not to expose the disk 10 unless an external force is applied.

For writing data on, and/or reading data from, the disk cartridge 100 by a disk apparatus (not shown), the cartridge shutter 103 is moved in the direction of arrow T to expose the disk 10 in order to clamp the disk 10 and allow the writing and/or reading means to approach the disk 10. At this point, the movement of the disk cartridge 100 in the direction of arrow Q to enter the disk apparatus is utilized to engage a projection 104a of a shutter opener 104 with a notch 103a of the shutter 103. As the disk cartridge 100 is moved in the direction of arrow Q, the shutter opener 104 is pivoted in the direction of arrow R around a pivoting center 104b, which, in turn, moves the shutter 103 in the direction of arrow T.

In order to catch a disk or allow an optical head to access the entire data storage surface of the disk, a conventional disk cartridge as the disk cartridge disclosed in Japanese Laid-Open Patent Publication No. 9-153264 needs to have a window for such purposes in an area from a center to an edge of the cartridge. In a disk cartridge of this structure, the shutter moves linearly with respect to the housing of the cartridge. Therefore, the disk cartridge needs to have an area to which the shutter is retracted when the shutter is opened. For these reasons, the size of the window depends on the external size of the cartridge. It is very difficult to design a small cartridge having a large window. This causes a problem that in a compact device or a disk video camera using a small cartridge, the size of the optical head is restricted.

SUMMARY OF THE INVENTION

In order to overcome the problems described above, preferred embodiments of the present invention provide a disk apparatus compatible with a disk cartridge having a large head window even with a small external size.

A disk apparatus, according to the present invention, allowing a disk cartridge enclosing a disk to be mounted thereon, the disk apparatus includes a cartridge holder for supporting the disk cartridge, the cartridge holder having a holder window for allowing the disk cartridge to be inserted to the cartridge holder from outside and to be ejected from the cartridge holder to outside; a pair of guide walls located in the vicinity of the holder window of the cartridge holder for defining a direction in which the disk cartridge is inserted; a disk motor for allowing the disk to be mounted thereon and rotating the disk; a head for performing at least one of writing data on the disk and reading data from the disk; a base for supporting the head and the disk motor; first and second slider guides provided in the cartridge holder; a first open/close slider having a first engageable portion engageable with a part of the disk cartridge, the first open/close slider being slidable along the first slider guide of the cartridge holder; and a second open/close slider having a second engageable portion engageable with a part of the disk cartridge, the second open/close slider being slidable along the second slider guide of the cartridge holder. The first and second open/close sliders slide to allow the first engageable portion and the second engageable portion to be engaged with the disk cartridge such that a distance between the first and second engageable portions is smaller than a distance between the pair of guide walls while the disk cartridge is inserted, and such that the distance between the first and second engageable portions is larger than the distance between the pair of guide walls when the disk cartridge is mounted, and thus the first and second open/close sliders form a window in the disk cartridge so as to allow the head to access the disk and allow the disk to be mounted on the disk motor.

According to one preferred embodiment, the first and second open/close sliders slide in a direction perpendicular to the direction in which the disk cartridge is inserted.

According to another preferred embodiment, the first and second open/close sliders slide in a direction which is neither perpendicular nor parallel to the direction in which the disk cartridge is inserted.

According to still another preferred embodiment, during the insertion operation of the disk cartridge, the first and second engageable portions start to be engaged with the disk cartridge at positions closer to the holder window than positions at which the first and second engageable portions are located in the state where the disk cartridge is mounted.

According to still another preferred embodiment, the disk cartridge includes first and second disk storage portions each having a space for storing a part of the disk, the first and second disk storage portions storing the entire disk when being joined together, and also includes a support base member for supporting the first and second disk storage portions to be pivotable around pivoting axes thereof; and when the disk cartridge is inserted, the first and second disk storage portions are pivoted so as to form the window by engagement of the first and second engageable portions of the first and second open/close sliders with the first and second disk storage portions.

According to still another preferred embodiment, the first and second disk storage portions of the disk cartridge include: notches engageable with the corresponding first and second engageable portions of the first and second open/close sliders such that the first and second engageable portions are pivotable; and association portions associated with each other to pivot the first and second disk storage portions around the pivoting axes in opposite directions in synchronization.

According to still another preferred embodiment, while the disk cartridge is inserted or ejected, the first engageable portion and the notch of the first disk storage portion are engaged with each other, so that a first link mechanism is formed of the first disk storage portion connecting two nodes, wherein one of the nodes is the engagement of the first engageable portion and the notch of the first disk storage portion and the other node is the pivoting axis of the first disk storage portion; and the second engageable portion and the notch of the second disk storage portion are engaged with each other, so that a second link mechanism is formed of the second disk storage portion connecting two nodes, wherein one of the nodes is the engagement of the second engageable portion and the notch of the second disk storage portion and the other node is the pivoting axis of the second disk storage portion; and the first and second disk storage portions are rotated around the pivoting axes thereof in opposite directions in synchronization, so that the first and second link mechanisms maintain the direction in which the disk cartridge is inserted and position the disk cartridge while the disk cartridge is inserted or ejected.

According to still another preferred embodiment, the pair of guide walls are provided only in the vicinity of the holder window.

According to still another preferred embodiment, a direction in which the first and second open/close sliders slide is perpendicular to the pivoting axes of the first and second disk storage portions.

According to still another preferred embodiment, the disk apparatus further comprises a positioning member contactable with an outer circumferential surface of the disk in the state where the disk cartridge is mounted, wherein the positioning member and the disk contact each other so as to position the center of the disk with respect to the disk motor.

According to still another preferred embodiment, the first and second open/close sliders have guide faces in the vicinity of the first and second engageable portions, the guide faces contacting bottom surfaces of the first and second disk storage portions while the disk cartridge is inserted or ejected.

According to still another preferred embodiment, the positioning member is provided in the cartridge holder.

According to still another preferred embodiment, the positioning member is provided on the base.

According to a disk apparatus of the present invention, while the disk cartridge is inserted, the distance between the first and second engageable portions of the first and second open/close sliders is smaller than the distance between the pair of guides. Therefore, the first and second engageable portions contact, and are engaged with, the inserted disk cartridge with certainty. In the state where the disk cartridge is mounted, the first and second open/close sliders pivot such that the distance between the first and second engageable portions is larger than the distance between the pair of guides. Therefore, the disk storage portions can be opened such that the shutter and the disk storage portions extend beyond the projected area of the disk cartridge in the state where the disk storage portions are closed, so that a large window is formed. Accordingly, the disk apparatus is compatible with a disk cartridge having a large head window even with a small external size.

The sliding direction of the first and second open/close sliders is generally perpendicular to the insertion/ejection direction of the disk cartridge, or extends in a direction which is neither perpendicular nor parallel to the insertion/ejection direction of the disk cartridge. Owing to this structure, when the disk cartridge is inserted with the leading end and the trailing end being inverted, the first and second open/close sliders are not slid, or substantially slid, by the insertion operation. In such a case, the disk cartridge is prevented from being inserted into the disk apparatus. In the structure where the first and second open/close sliders have such a wrong insertion prevention function, the number of elements of the disk apparatus can be reduced.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

The present applicant proposed a disk cartridge capable of having a small external size and a large head window in PCT/JP2007/059444, which has not been published. A disk apparatus according to the present invention is compatible with this disk cartridge. Hereinafter, a structure of the disk cartridge will be described.

Figure 19A:
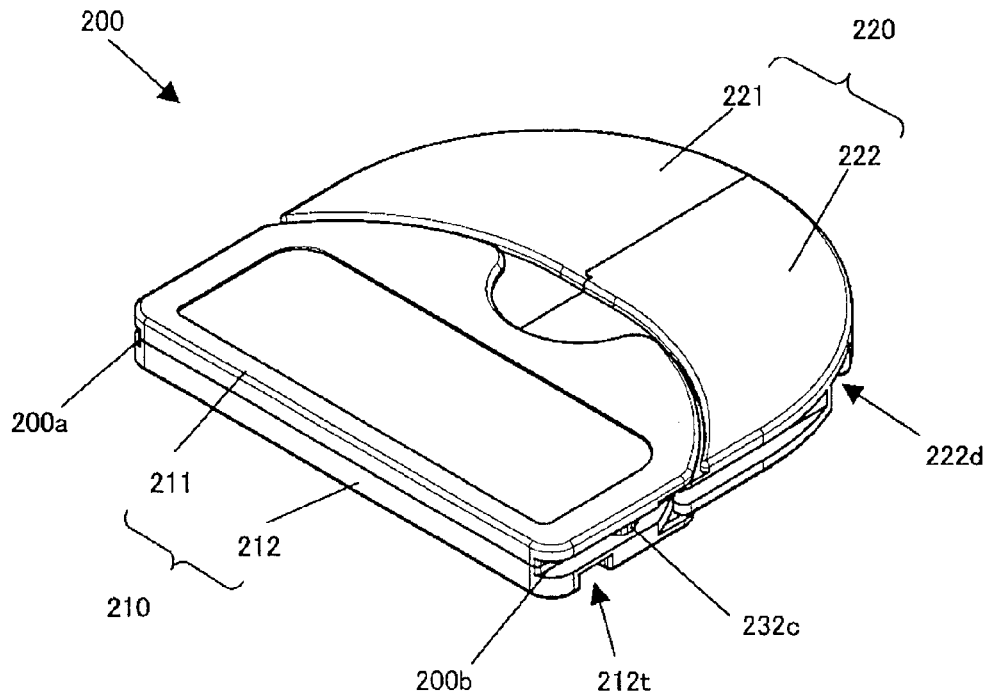
FIG. 19A is an isometric view, seen from above, of the entirety of a disk cartridge in which a window is opened/closed by pivoting a disk cartridge in two directions, in a state where the disk cartridge is closed.
Figure 19B:
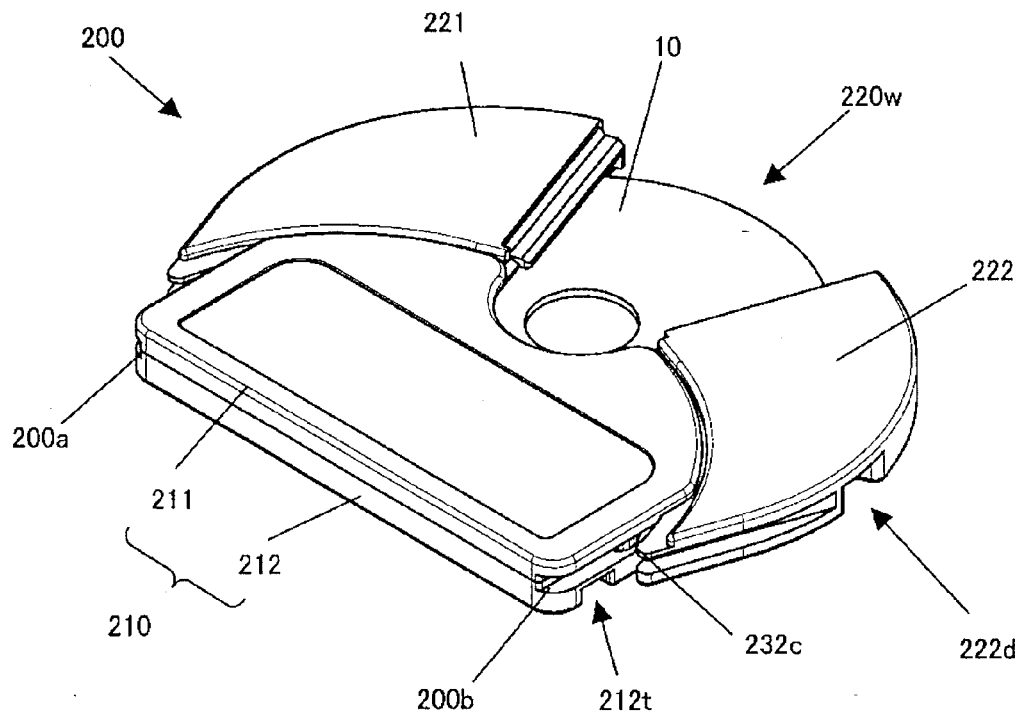
FIG. 19B is an isometric view, seen from above, of the entirety of the disk cartridge in which the window is opened/closed by pivoting the disk cartridge in two directions, in a state where the disk cartridge is opened.
Figure 20A:
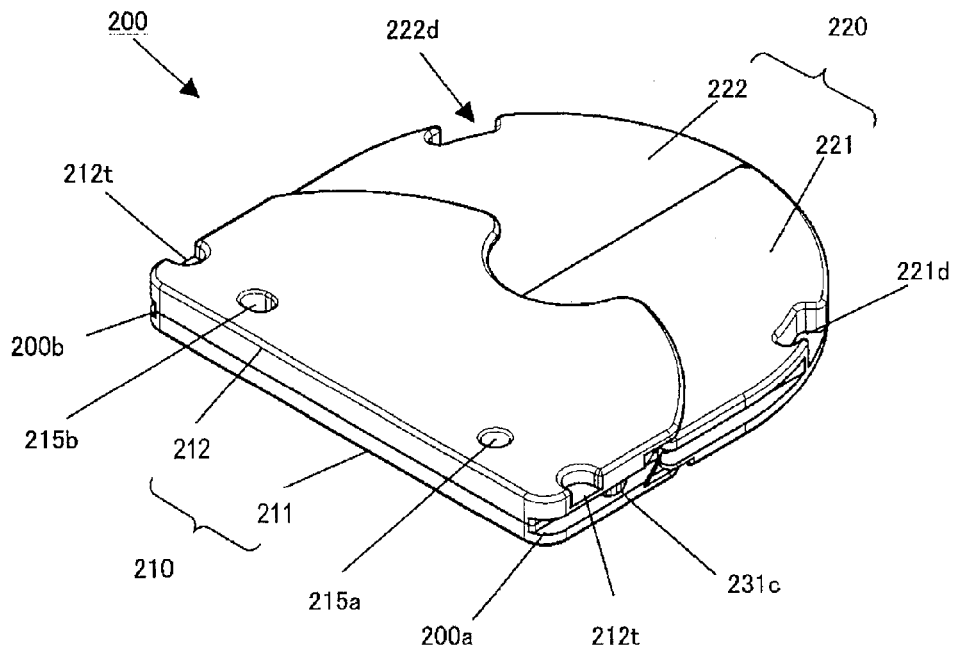
FIG. 20A is an isometric view, seen from below, of the entirety of the disk cartridge in which the window is opened/closed by pivoting the disk cartridge in two directions, in the state where the disk cartridge is closed.
Figure 20B:
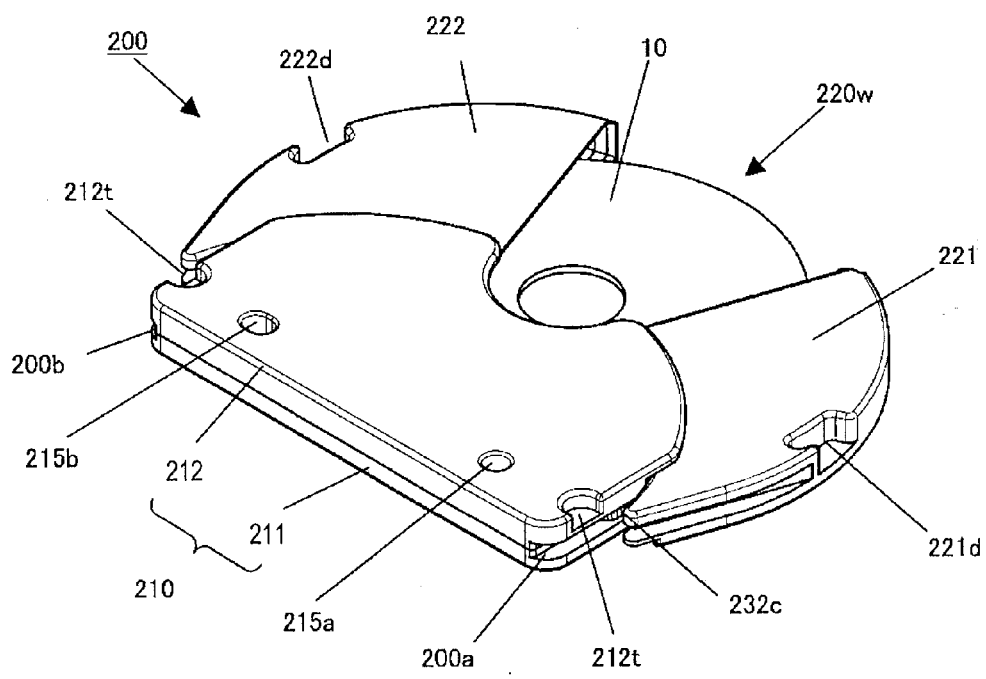
FIG. 20B is an isometric view, seen from below, of the entirety of the disk cartridge in which the window is opened/closed by pivoting the disk cartridge in two directions, in the state where the disk cartridge is closed.
Figure 21:
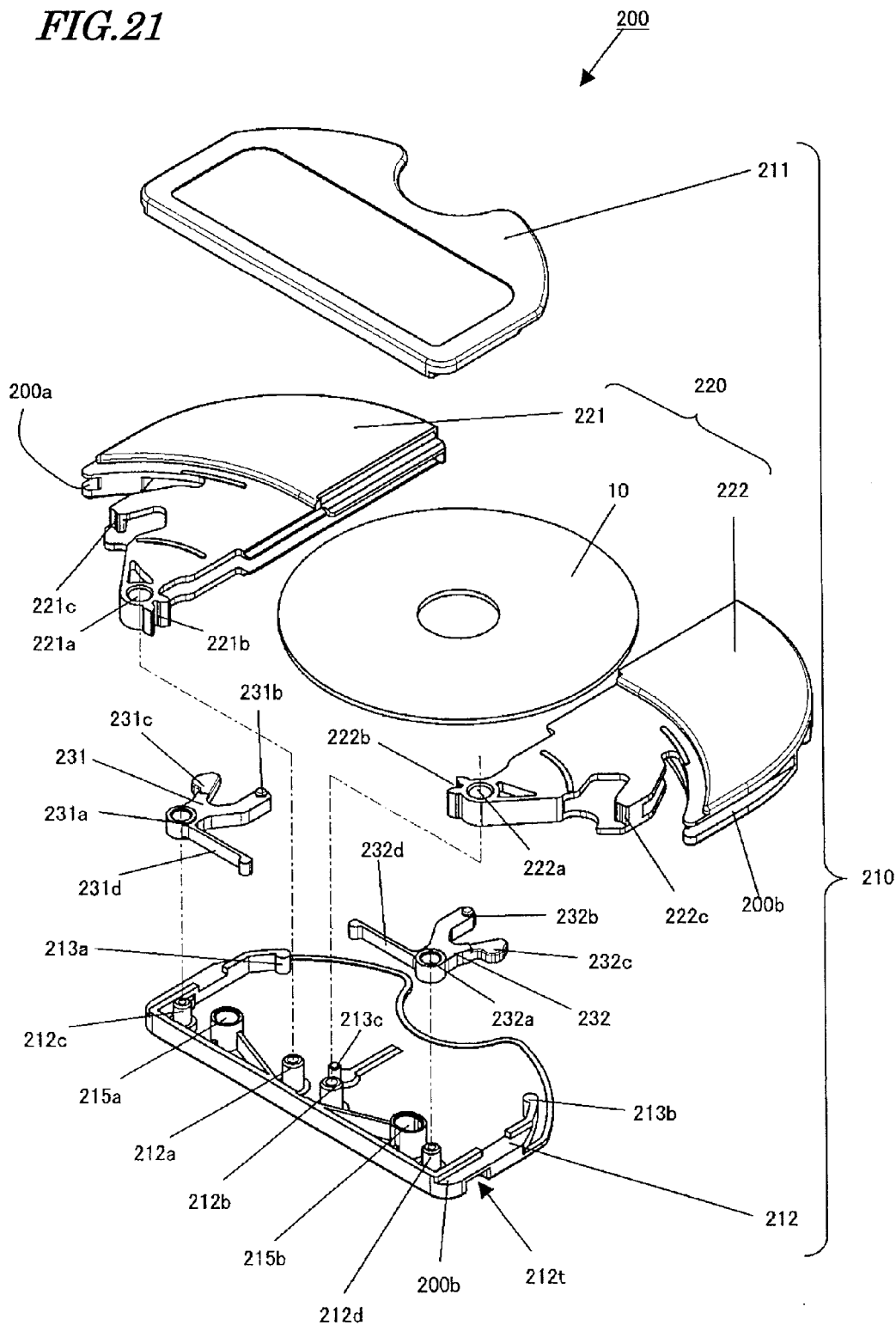
FIG. 21 is an exploded isometric view of the disk cartridge in which the window is opened/closed by pivoting the disk cartridge in two directions.

FIG. 19A and FIG. 19B are isometric views, seen from above, of the entirety of a disk cartridge 200 mountable on a disk apparatus according to the present invention. FIG. 19A shows a state where the window is closed, and FIG. 19B shows a state where the window is opened to expose a part of the disk 10. FIG. 20A and FIG. 20B are isometric views of the entirety of the disk cartridge 200 seen from below. FIG. 20A shows a state where the window is closed, and FIG. 20B shows a state where the window is opened to expose a part of the disk 10. FIG. 21 is an exploded isometric view showing elements of the disk cartridge 200.

The disk cartridge 200 includes a first disk storage portion 221, a second disk storage portion 222, and a support base 210.

The first disk storage portion 221 and the second disk storage portion 222 each have a space for storing a part of the disk 10, and when being joined together, form a disk storage portion 220 for storing the entire disk 10. More specifically, the first disk storage portion 221 and the second disk storage portion 222 each have a flat bag-type space for storing a part of the disk 10. When being put to a closed state with the edges of the spaces being matched, the first disk storage portion 221 and the second disk storage portion 222 form a space for storing the entire disk 10. Hereinafter, the first disk storage portion 221 and the second disk storage portion 222 may be collectively referred to as the "disk storage portion 220".

The support base 210 supports the first and second disk storage portions 221 and 222 such that the first and second disk storage portions 221 and 222 are rotatable around pivoting axes thereof. At least a part of the support base 210 overlaps the first and second disk storage portions 221 and 222 so as to inhibit the first and second disk storage portions 221 and 222 from moving in the direction vertical to the disk 10.

As shown in FIG. 19B and FIG. 20B, in the state where the first and the second disk storage portions 221 and 222 are opened, a generally fan-shaped window 220w is formed for allowing means for rotating the disk 10 such as a disk motor, a clamp member or the like and a head for performing data writing and/or reading to approach and access the disk 10.

Thus, the first and second disk storage portions 221 and 222 have two functions, i.e., a function of an external housing of the disk cartridge 200 and a function of a shutter for opening or closing the window 220w.

As shown in FIG. 19A and FIG. 20A, when seen from the above or below, a part of the disk cartridge 200 in which the window 220w is formed is arc-shaped. Therefore, an edge of this part of each of the first disk storage portion 221 and the second disk storage portion 222 has a curved profile.

The support base 210 includes a top support base member 211 and a bottom support base member 212. As shown in FIG. 21, the bottom support base member 212 has positioning holes 215a and 215b for positioning the disk cartridge 200 in a plane parallel to the disk 10 in the disk apparatus (not shown). Both side surfaces of the bottom support base member 212 have a notch 212t, which is used, for example, for preventing the disk cartridge 200 from being mounted upside down in a tray loading system or for engaging and thus holding the disk cartridge 200 in a slot loading system.

The first disk storage portion 221 and the second storage portion 222 respectively have a pivoting center hole 221a and a pivoting center hole 222a. When rotation support shafts 212a and 212b included in the bottom support base member 212 are inserted into the pivoting center holes 221a and 222a, the first disk storage portion 221 and the second storage portion 222 are rotatably supported using the rotation support shafts 212a and 212b as the pivoting axes.

The first disk storage portion 221 and the second disk storage portion 222 respectively have association portions 221b and 222b which are engageable with each other. Owing to the engagement of the association portions 221b and 222b, the first disk storage portion 221 and the second disk storage portion 222 can rotate around the rotation support shafts 212a and 212b in opposite directions to each other.

The first disk storage portion 221 and the second disk storage portion 222 respectively have notches 221*d* and 222*d*, which are used for opening or closing the first and second disk storage portions 221 and 222 from outside.

A first lock member 231 and a second lock member 232 respectively have pivoting center holes 231*a* and 232*a*. When rotating support shafts 212*c* and 212*d* included in the bottom support base member 212 are inserted into the pivoting center holes 231*a* and 232*a*, the first lock member 231 and the second lock member 232 are pivotably attached to the bottom support base member 212.

The first lock member 231 includes a stop lever 231*b* for engaging a stop portion 221*c* of the first disk storage portion 221 in the state where the first and second disk storage portions 221 and 222 are closed and thus inhibiting the first disk storage portion 221 from pivoting to be in an open state. The first lock member 231 also includes an operation portion 231*c* usable for operating the first lock member 231 from outside, and an elastic portion 231*d* elastically deformable against an operation from outside to function.

Similarly, the second lock member 232 includes a stop lever 232*b* for engaging a stop portion 222*c* of the second disk storage portion 222 in the state where the disk storage portion 220 is closed and thus inhibiting the second disk storage portion 222 from pivoting to be in an open state. The second lock member 232 also includes an operation portion 232*c* usable for operating the second lock member 232 from outside, and an elastic portion 232*d* elastically deformable against an operation from outside to function.

The disk cartridge 200 has unlock slits 200*a* and 200*b* on both side surfaces thereof usable for operating the first and second lock members 231 and 232. The operation portions 231*c* and 232*c* of the first and second lock members 231 and 232 are structured to project into the slits 200*a* and 200*b* but not to project outside the disk cartridge 200. This makes it difficult for an operator of the disk cartridge 200 to press the operation portions 231*c* and 232*c* with his/her hand or finger, and thus prevents intentional operations from outside.

Figure 22A:
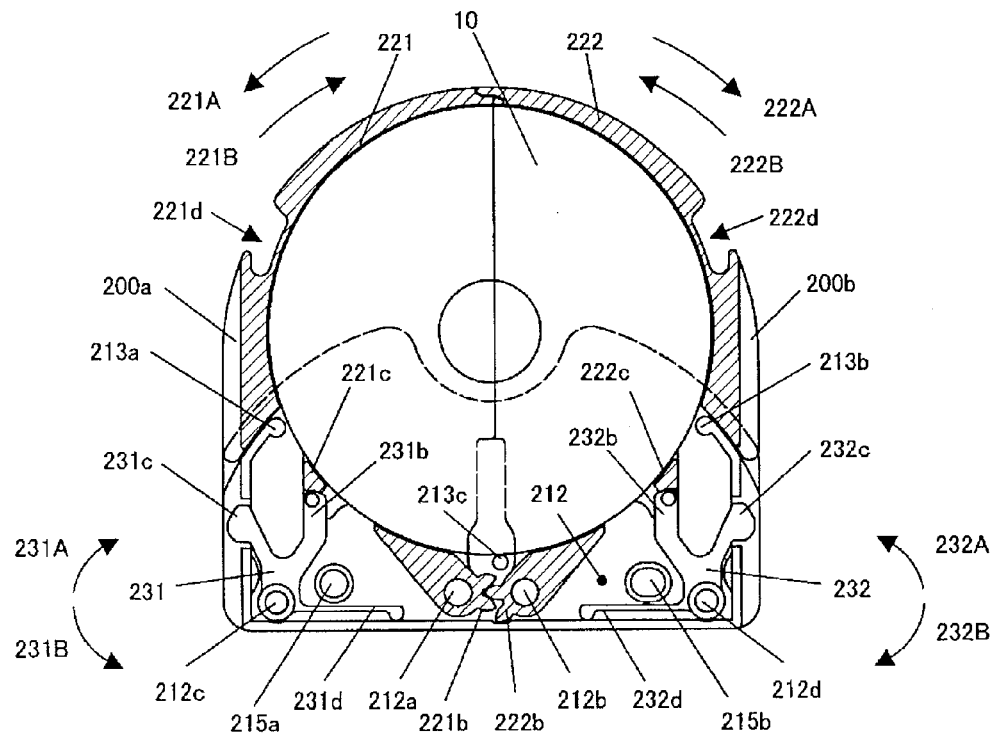
FIG. 22A is a partial cross-sectional view of the disk cartridge shown in FIG. 19A and FIG. 19B, in the state where the disk storage portion is closed.
Figure 22B:
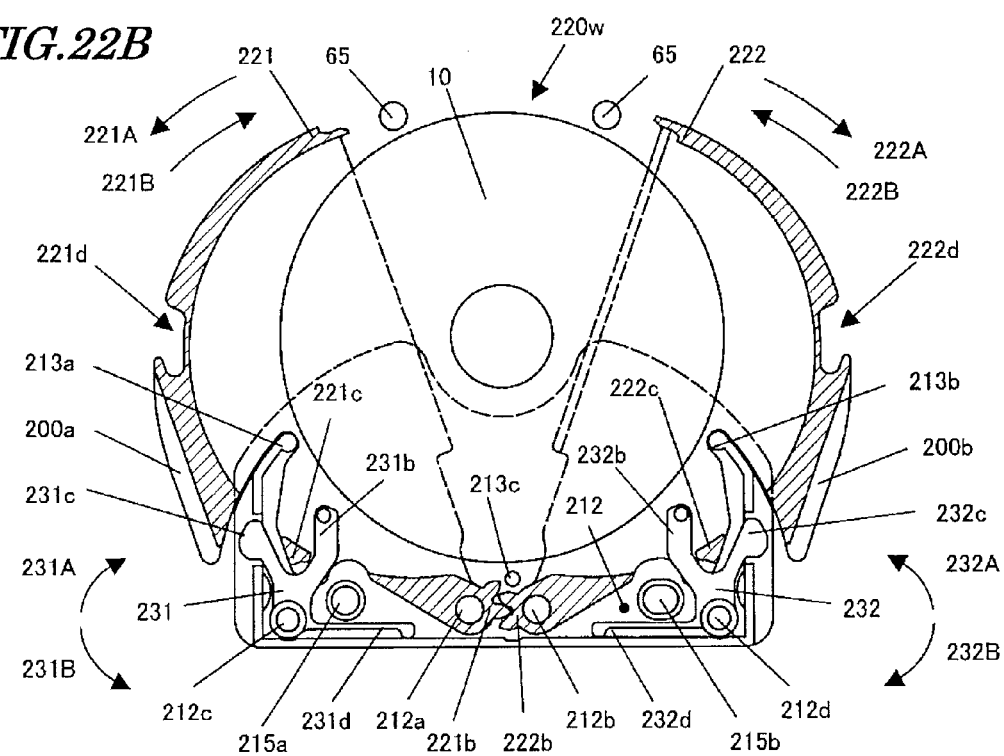
FIG. 22B is a partial cross-sectional view of the disk cartridge shown in FIG. 19A and FIG. 19B, in the state where the disk storage portion is opened.

Now, an operation for opening and closing the disk storage portion 220 of the disk cartridge 200 will be described. FIG. 22A is a partial cross-sectional view of the disk cartridge 200 in the state where the first and second disk storage portions 221 and 222 are closed. FIG. 22B is a partial cross-sectional view of the disk cartridge 200 in the state where the first and second disk storage portions 221 and 222 are opened.

As shown in FIG. 22A, in the state where the first and second disk storage portions 221 and 222 are closed, the stop levers 231*b* and 232*b* of the first and second lock member 231 and 232 contact the stop portions 221*c* and 222*c* of the first and second disk storage portion 221 and 222. Thus, the first and second disk storage portion 221 and 222 are locked against rotation in the directions of arrows 221A and 222A. At this point, the elastic portions 231*d* and 232*d* are not elastically deformed. In order to prevent the disk 10 from unstably moving in the disk cartridge 200, the first and second disk storage portions 221 and 222 have portions on inner walls thereof for contacting an outer circumferential surface or an edge of the outer circumferential surface of the disk 10 in the state where the first and second disk storage portions 221 and 222 are closed. Thus, the disk 10 is held when the disk storage portion 220 is closed.

As described later in more later, from the state shown in FIG. 22A, the first and second lock members 231 and 232 are pressed down at the same time to unlock the first and second disk storage portions 221 and 222 and thus to allow the first and second disk storage portions 221 and 222 to rotate in the directions of arrows 221A and 222A respectively. Then, as shown in FIG. 22B, the first and second disk storage portions 221 and 222 are opened. In this state, the inner walls of the first and second disk storage portions 221 and 222 are separated from the disk 10, and so the disk 10 could be at any position with respect to the support base 210 as long as the disk 10 does not contact either first disk storage portion 221 or the second disk storage portion 222. Thus, the position of the disk 10 is restricted by position restriction portions 213*a*, 213*b* and 213*c* included in the bottom support base member 212 and a positioning member 65 included in the disk apparatus.

In order to close the first and second disk storage portions 221 and 222, an operation opposite to the opening operation is performed. That is, the first and second disk storage portions 221 and 222 are rotated in the directions of arrows 221B and 222B respectively. At this point, the first and second lock members 231 and 232 contact the stop portions 221*c* and 222*c* of the first and second disk storage portions 221 and 222 and so are pivoted in the directions of arrows 231A and 232A respectively. When the disk storage portion 220 is closed as shown in FIG. 22A, the first and second lock members 231 and 232 are pivoted in the directions of arrow 231B and 232B by the elastic force of the elastic portions 231*d* and 232*d* respectively. As a result, the stop levers 231*b* and 232*b* of the first and second lock members 231 and 232 contact the stop portions 221*c* and 222*c* of the first and second disk storage portions 221 and 222, and thus lock the disk storage portion 220 against rotation. In this manner, the operation for closing the first and second disk storage portions 221 and 222 is completed.

In the state where the first and second disk storage portions 221 and 222 are opened as shown in FIG. 22B, the projected area of the disk 10, the first and second disk storage portions 221 and 222 and the support base 210 as seen in the direction of the rotation axis of the disk 10 is larger than that in the state where the first and second disk storage portions 221 and 222 are closed as shown in FIG. 22A. However, this allows the window 220*w* to be larger and provides an effect of significantly improving the degree of designing flexibility for the head.

Figure 23A:
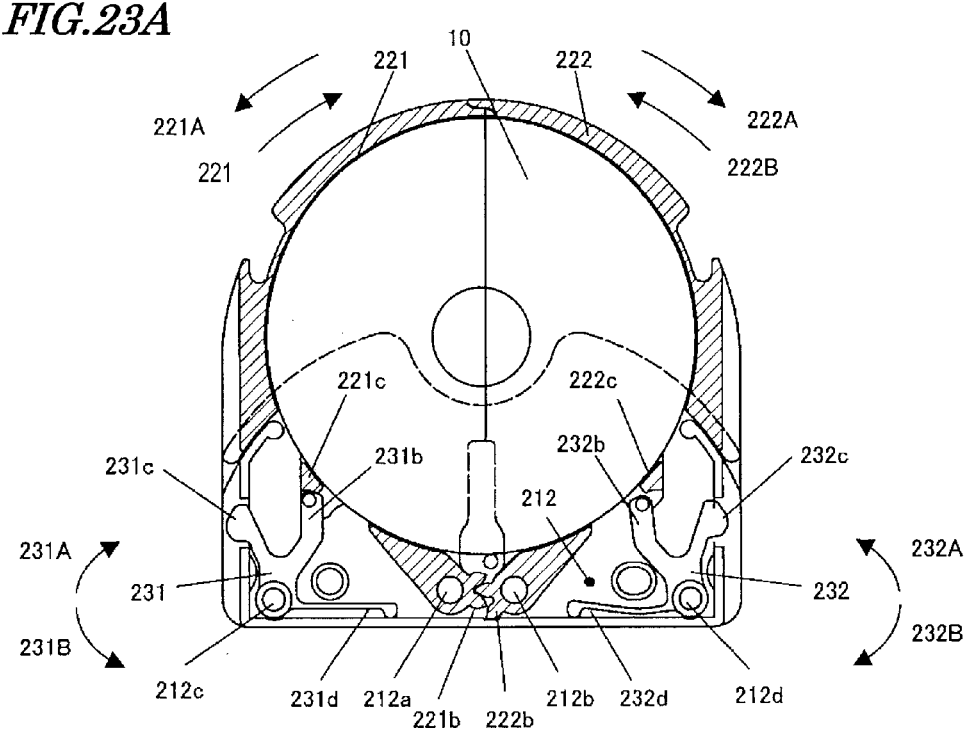
FIG. 23A is a partial cross-sectional view of the disk cartridge shown in FIG. 19A and FIG. 19B, in a state where only a second lock member is unlocked.
Figure 23B:
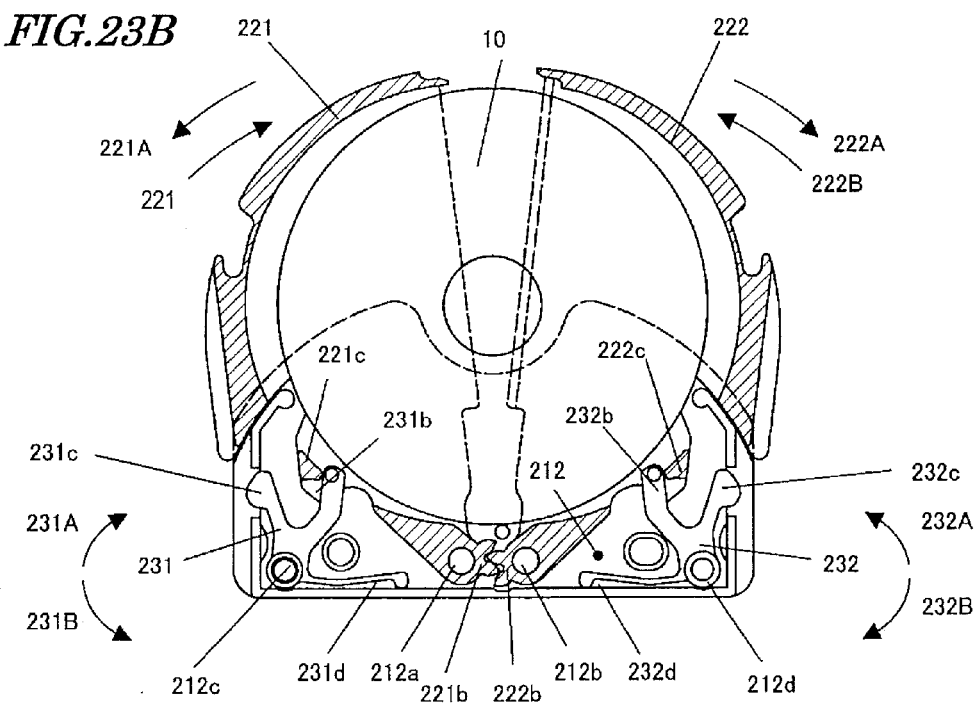
FIG. 23B is a partial cross-sectional view of the disk cartridge shown in FIG. 19A and FIG. 19B, in a state where first and second lock members are unlocked at the same time.

Now, an unlocking operation will be described. FIG. 23A shows a state where the first and second disk storage portions 221 and 222, which have been locked by the first and second lock members 231 and 232, are unlocked from only the second lock member 232. FIG. 23B shows a state where the first and second disk storage portions 221 and 222, which have been locked by the first and second lock members 231 and 232, are unlocked from the first and second lock member 231 and 232 at the same time. In the state where the first and second disk storage portions 221 and 222 are closed, as can be seen from FIG. 23A, the first and second disk storage portions 221 and 222 are locked by the first and second lock member 231 and 232 against rotation in the directions of arrows 221A and 222A.

When the operation portion 232*c* of the second lock member 232 is pressed from outside, as shown in FIG. 23A, the second lock member 232 is rotated in the direction of arrow 232A while deforming the elastic portion 232*d*. In this state, the stop lever 232*b* of the second lock member 232 is separated from the stop portion 222*c* of the second disk storage portion 222 to release the second disk storage portion 222 from the locked state. However, the first and second disk storage portions 221 and 222 are associated with each other by the association portions 221*b* and 222*b*, and also the first disk storage portion 221 is still locked by the first lock member 231. Therefore, the rotation of the second disk storage portion 222 is inhibited by the first disk storage portion 221 in the locked state, which prevents the first and second disk storage portions 221 and 222 from being opened. Namely, in the case where one of the first and second lock members 231 and 232 is unlocked from outside, the first and second disk storage portions 221 and 222 cannot be opened.

When the operation portions 231c and 232c of the first and second lock members 231 and 232 are pressed from outside at the same time, as shown in FIG. 23B, the first and second lock member 231 and 232 are rotated in the directions of arrows 231A and 232A respectively while deforming the elastic portions 231d and 232d at the same time. In this state, the stop levers 231b and 232b of the first and second lock members 231 and 232 are respectively separated from the stop portions 221c and 222c of the first and second disk storage portions 221 and 222 to release the first and second disk storage portions 221 and 222 from the locked state. As a result, the first and second disk storage portions 221 and 222 are allowed to rotate in the directions of arrows 221A and 222A respectively, which allows the first and second disk storage portions 221 and 222 to be opened. Namely, in the case where the first and second lock members 231 and 232 are unlocked at the same time, the first and second disk storage portions 221 and 222 can be opened.

A disk apparatus according to the present invention allows the disk cartridge 200 described above to be mounted thereon and can write data on the disk 10 stored in the disk cartridge 200 or reading data on the disk 10. Here, the term "mounted" refers to a state where a disk cartridge 200 is inserted into a disk apparatus and then a disk in the disk cartridge 200 is placed on a disk motor so that writing data on, or reading data from, the disk is possible. The structure of the disk cartridge 200 has been described. In the following embodiments of a disk apparatus, a structure of the disk apparatus will be mainly described.

Embodiment 1

Hereinafter, a First Embodiment of a Disk Apparatus according to the present invention will be described in detail with reference to the drawings.

Figure 1:
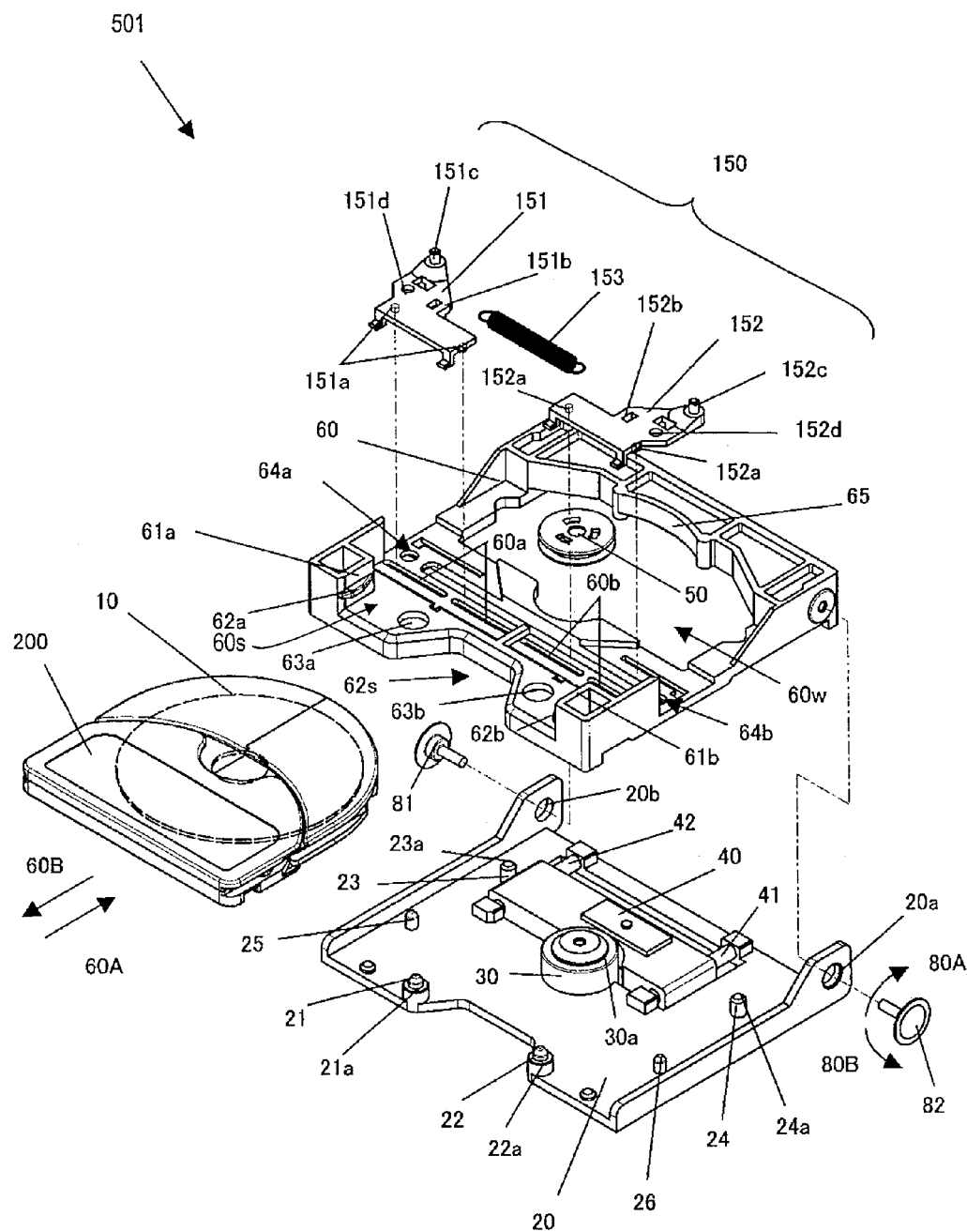
FIG. 1 is an exploded isometric view of a disk apparatus according to a first embodiment of the present invention.
Figure 2:
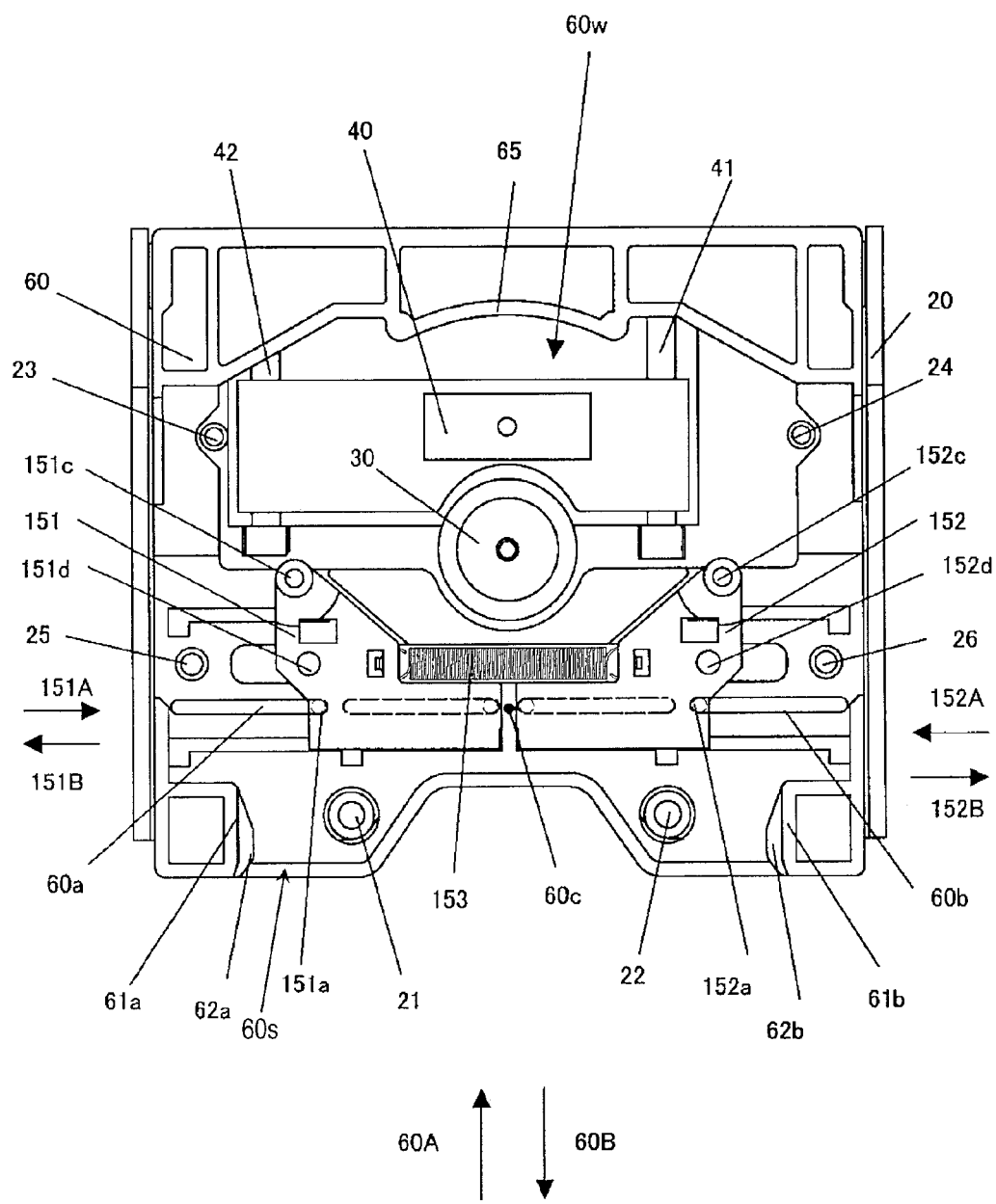
FIG. 2 is a plan view showing a structure of the disk apparatus according to the first embodiment.
Figure 3A:
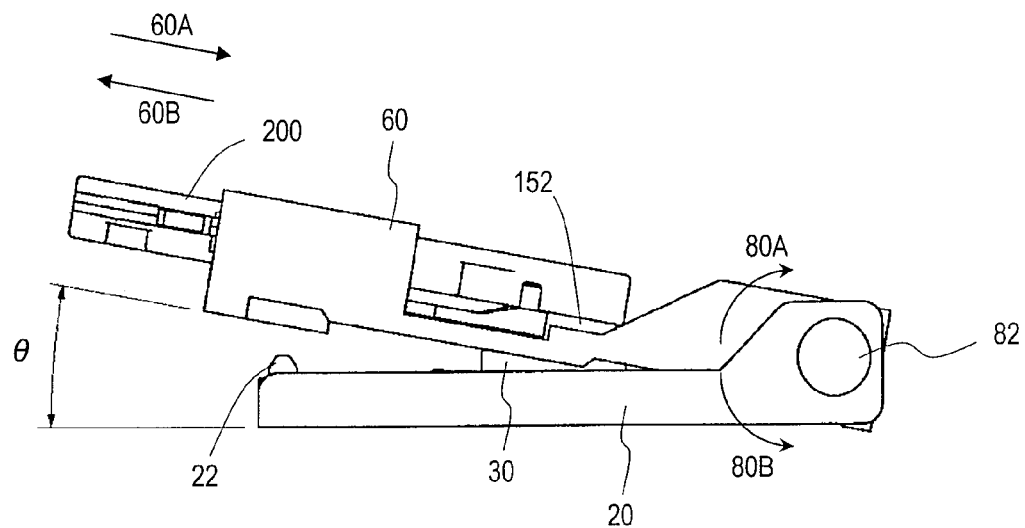
FIG. 3A is a side view of a cartridge holder in the first embodiment, showing a state where a disk cartridge is inserted or ejected.
Figure 3B:
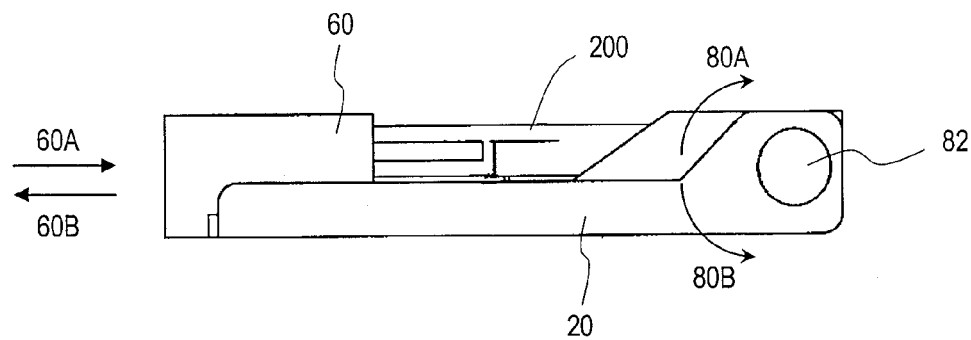
FIG. 3B is a side view of the cartridge holder in the first embodiment, showing a state where writing on, or reading from, a disk can be performed.

FIG. 1 and FIG. 2 are respectively an exploded isometric view and a plan view of a disk apparatus 501 according to the first embodiment of the present invention, which allows the disk cartridge 200 to be mounted thereon. FIG. 3A is a side view of the disk apparatus 501 in a state where the disk cartridge 200 is inserted/ejected. FIG. 3B is a side view of the disk apparatus 501 in a state where writing data on, or reading data from, the disk 10 can be performed.

As shown in FIG. 1 and FIG. 2, the disk apparatus 501 includes a traverse base 20, a disk motor 30 and an optical head 40.

The disk motor 30 has a disk placing surface 30a on which the disk 10 stored in the disk cartridge 200 can be placed. The disk motor 30 is fixed on the traverse base 20. The optical head 40 is supported by the traverse base 20 so as to be movable along guide shafts 41 and 42. The optical head 40 is movably driven in a radial direction of the disk 10 placed on the disk placing surface 30a of the disk motor 30 along the guide shafts 41 and 42 by a driving source (not shown) provided on the traverse base 20.

The optical head 40 can write data on the disk 10 and read data from the disk 10. The disk apparatus 501 may be capable of both writing and reading, or may be capable of either writing or reading.

On the traverse base 20, cartridge positioning pins 21 and 22 are provided. The positioning pins 21 and 22 respectively have seats 21a and 22a, which are contactable with a bottom surface of the bottom support base member 212 of the disk cartridge 200. The cartridge positioning pins 21 and 22 are used to position the disk cartridge 200 with respect to the disk motor 30. Also provided on the traverse base 20 are a fixed pin 23 having a seat 23a contactable with a bottom surface of the first disk storage portion 221 and a fixed pin 24 having a seat 24a contactable with a bottom surface of the second disk storage portion 222. These seats 23a and 24a are used to position the disk cartridge 200 in a height direction, together with the seats 21a and 22a of the cartridge positioning pins 21 and 22.

On the traverse base 20, slider positioning pins 25 and 26 are provided, which are engageable with positioning holes 151d and 152d of first and second open/close sliders 151 and 152 (described later) to position the first and second open/close sliders 151 and 152 with respect to the disk motor 30.

The disk apparatus 501 also includes a clamper 50 and a cartridge holder 60 on which the disk cartridge 200 is mountable.

The clamper 50 holds the disk 10 together with the disk placing surface 30a of the disk motor 30 and clamps the disk 10 to be rotatable by the disk motor 30. The clamper 50 is held by a clamper support member (not shown) and supported by the cartridge holder 60.

The cartridge holder 60 supports the disk cartridge 200. The cartridge holder 60 has a holder window 60s for allowing the disk cartridge 200 to be inserted into the cartridge holder 60 from outside in the direction of arrow 60A or allowing the disk cartridge 200 in the cartridge holder 60 to be ejected outside in the direction of arrow 60B. The holder window 60s is an open space provided in the cartridge holder 60. A housing for covering the entire disk apparatus 501 may have another window for allowing the disk cartridge 200 to be inserted into, or ejected from, the disk apparatus 501.

The cartridge holder 60 includes a pair of guide walls 61a and 61b in the vicinity of the holder window 60s. The guide walls 61a and 61b define the direction in which the disk cartridge 200 is inserted or ejected. When the disk cartridge 200 is to be inserted into the cartridge holder 60 or when the disk cartridge 200 is to be ejected from the cartridge holder 60, the guide walls 61a and 61b contact the side surfaces of the disk cartridge 200 to guide the disk cartridge 200 such that the disk cartridge 200 can be inserted in the direction of arrow 60A or ejected in the direction of arrow 60B. The guide walls 61a and 61b are provided only in the vicinity of the holder window 60s.

On the guide walls 61a and 61b, unlock portions 62a and 62b are provided. When the disk cartridge 200 is to be inserted in the direction of arrow 60A or ejected in the direction of arrow 60B, the unlock portions 62a and 62b are respectively projected into the unlock slits 200a and 200b of the disk cartridge 200 and press the operation portions 231c and 232c of the first and second lock members 231 and 232 of the disk cartridge 200.

The cartridge holder 60 has a window 60w in a bottom surface thereof for allowing the disk motor 30 and the optical head 40 to approach the disk 10. The cartridge holder 60 also has holes 63a and 63b and notches 64a and 64b in the bottom surface thereof for preventing the cartridge positioning pins 21 and 22 and the slider positioning pins 25 and 26 from interfering with the cartridge holder 60. The cartridge holder 60 further includes the positioning member 65 for positioning the disk 10 with respect to the center of the disk motor 30 when the disk cartridge 200 is mounted.

In order to facilitate the ejection of the disk cartridge 200 mounted on the cartridge holder 60, a notch 62s for exposing a part of the support base 210 of the disk cartridge 200 may be provided on the holder window 60s side of the cartridge holder 60.

The cartridge holder 60 is provided with shaft screws 81 and 82 inserted into pivoting center holes 20b and 20a formed in the traverse base 20. Thus, the cartridge holder 60 is supported by the traverse base 20 to be pivotable in the directions of arrows 80A and 80B.

Referring to FIG. 3A, for inserting the disk cartridge 200 to, or ejecting the disk cartridge 220 from, the cartridge holder 60 respectively in the direction of arrow 60A or 60B, the cartridge holder 60 is pivoted by angle θ in the direction of arrow 80A with respect to the traverse base 20. Thus, the disk cartridge 200 can be inserted or ejected without interfering with the disk motor 30, the optical head 40 or various positioning pins provided on the traverse base 20.

In the state where the disk cartridge 200 is inserted to the inside the cartridge holder 60 and the window 220w (FIG. 19B, etc.) of the disk cartridge 200 is opened, the cartridge holder 60 is pivoted in the direction of arrow 80B with respect to the traverse base 20. Then, as shown in FIG. 3B, the disk motor 30 and the optical head 40 provided on the traverse base 20 enter the window 220w of the disk cartridge 200, and various positioning pins are engaged with various positioning holes to position the disk cartridge 200. Thus, the disk cartridge 200 is mounted such that writing data on, or reading data from, the disk 10 is possible.

As shown in FIG. 1, the disk apparatus 501 also includes a cartridge open/close mechanism 150. The cartridge open/close mechanism 150 is engageable with a part of the disk cartridge 200. Along with the movement of the disk cartridge 200 of being inserted or ejected in the direction of arrow 60A or 60B, the cartridge open/close mechanism 150 opens or closes the first and second disk storage portions 221 and 222. Specifically, the cartridge open/close mechanism 150 includes the first open/close slider 151, the second open/close slider 152 and a slider loading spring 153, and is provided on the cartridge holder 60. More specifically, the cartridge open/close mechanism 150 is structured two-dimensionally and provided below the disk cartridge 200 to be inserted.

The first and second open/close sliders 151 and 152 are engageable with first and second slider guides 60a and 60b formed in the cartridge holder 60 to be attached to the cartridge holder 60 such that the first and second open/close sliders 151 and 152 are slidable in the direction perpendicular to the insertion/ejection direction of the disk cartridge 200 (in the direction of arrow 60A/60B). In this embodiment, the first and second slider guides 60a and 60b are grooves, and the first and second open/close sliders 151 and 152 respectively include guide projections 151a and 152a engageable with the grooves. As long as being slidable with respect to the cartridge holder 60, the first and second open/close sliders 151 and 152 may be engaged by other mechanical elements. For example, the first and second slider guides 60a and 60b may be projections, and the first and second open/close sliders 151 and 152 may have grooves.

The slider loading spring 153 is formed of a tensile spring. One end of the slider loading spring 153 is attached to an attaching portion 151b of the first open/close slider 151 while the other end of the slider loading spring 153 is attached to an attaching portion 152b of the second open/close slider 152. Thus, as shown in FIG. 2, the first open/close slider 151 is loaded in the direction of arrow 151A and the second open/close slider 152 is loaded in the direction of arrow 152A, and thus a uniform loading force is supplied to the first and second open/close sliders 151 and 152. As long as being capable of loading the first and second open/close sliders 151 and 152 in the directions of arrows 151A and 152A respectively, any other elastic element is usable instead of the slider loading spring 153.

The first open/close slider 151 includes a first engageable portion 151c rotatably engageable with the notch 221d of the first disk storage portion 221 and a positioning hole 151d engageable with the slider positioning pin 25 provided on the traverse base 20. When the first open/close slider 151 slides in the direction of arrow 151A, the positioning hole 151d positions the first open/close slider 151 with respect to the disk motor 30.

Similarly, the second open/close slider 152 includes a second engageable portion 152c rotatably engageable with the notch 222d of the second disk storage portion 222 and a positioning hole 152d engageable with the slider positioning pin 26 provided on the traverse base 20. When the second open/close slider 152 slides in the direction of arrow 152A, the positioning hole 152d positions the second open/close slider 152 with respect to the disk motor 30.

As shown in FIG. 2, the first and second slider guides 60a and 60b are provided on the holder window 60w side with respect to the first and second engageable portions 151c and 152c of the first and second open/close sliders 151 and 152. The first and second slider guides 60a and 60b are also provided symmetrically with respect to a plane which is parallel to the directions of arrows 60A and 60B in which the disk cartridge 200 is inserted and ejected and also includes the rotation axis of the disk 10.

Similarly, the first and second engageable portions 151c and 152c of the first and second open/close sliders 151 and 152 are provided symmetrically with respect to the plane which is parallel to the directions of arrows 60A and 60B in which the disk cartridge 200 is inserted and ejected and also includes the rotation axis of the disk 10.

Accordingly, the first and second open/close sliders 151 and 152 provided as a pair are structured symmetrically with respect to the plane which is parallel to the directions of arrows 60A and 60B in which the disk cartridge 200 is inserted and ejected and also includes the rotation axis of the disk 10.

As shown in FIG. 2, the cartridge holder 60 includes a stopper 60c acting against the sliding operation of the first and second open/close sliders 151 and 152 in the directions of arrows 151A and 152A by the slider loading spring 153. Owing to the stopper 60c, the first and second open/close sliders 151 and 152 are kept at predetermined wait positions.

As shown in FIG. 2, the first and second open/close sliders 151 and 152, when being in contact with the stopper 60c, do not interfere with the slider positioning pins 25 and 26 provided on the traverse base 20. Therefore, even where the disk cartridge 200 is not mounted on the cartridge holder 60, the cartridge holder 60 may be pivoted to a lowered state shown in FIG. 3B with no problem.

Now, an operation of the cartridge open/close mechanism 150 will be described. The cartridge open/close mechanism 150 of the disk apparatus 501 performs an operation of opening the disk storage portion 220 of the disk cartridge 200 along with the operation of inserting the disk cartridge 200 into the cartridge holder 60 in the direction of arrow 60A, and performs an operation of closing the disk storage portion 220 along with the operation of ejecting the disk cartridge 200 from the cartridge holder 60 in the direction of arrow 60B.

The disk apparatus 501 according to the present invention does not include a driving source for transporting the disk cartridge 200. Therefore, the operation of inserting the disk cartridge 200 is performed by a manual operation by an operator, and the operation of ejecting the disk cartridge 200 is performed by an loading force of the slider loading spring 153 and the manual operation by the operator.

First, with reference to FIG. 4 through FIG. 8, an operation of the cartridge open/close mechanism 150 when the disk cartridge 200 is inserted into the cartridge holder 60 will be described. While the disk cartridge 200 is inserted or ejected, the cartridge holder 60 is slanted with respect to the traverse base 20 as shown in FIG. 3A. However, the traverse base 20 is not involved in the operation of inserting or ejecting the disk cartridge 200 and only the cartridge holder 60 is involved. For this reason, in FIG. 4 through FIG. 7, the cartridge holder 60 and the traverse base 20 are shown as if they were on the same plane. FIG. 8 shows a state where the mounting of the disk cartridge 200 is completed. In this state, the cartridge holder 60 is lowered as shown in FIG. 3B so as to allow the disk 10 of the disk cartridge 200 to be placed on the disk placing surface 30a of the disk motor 30, and so the cartridge holder 60 and the traverse base 20 are actually on the same plane.

Figure 4:
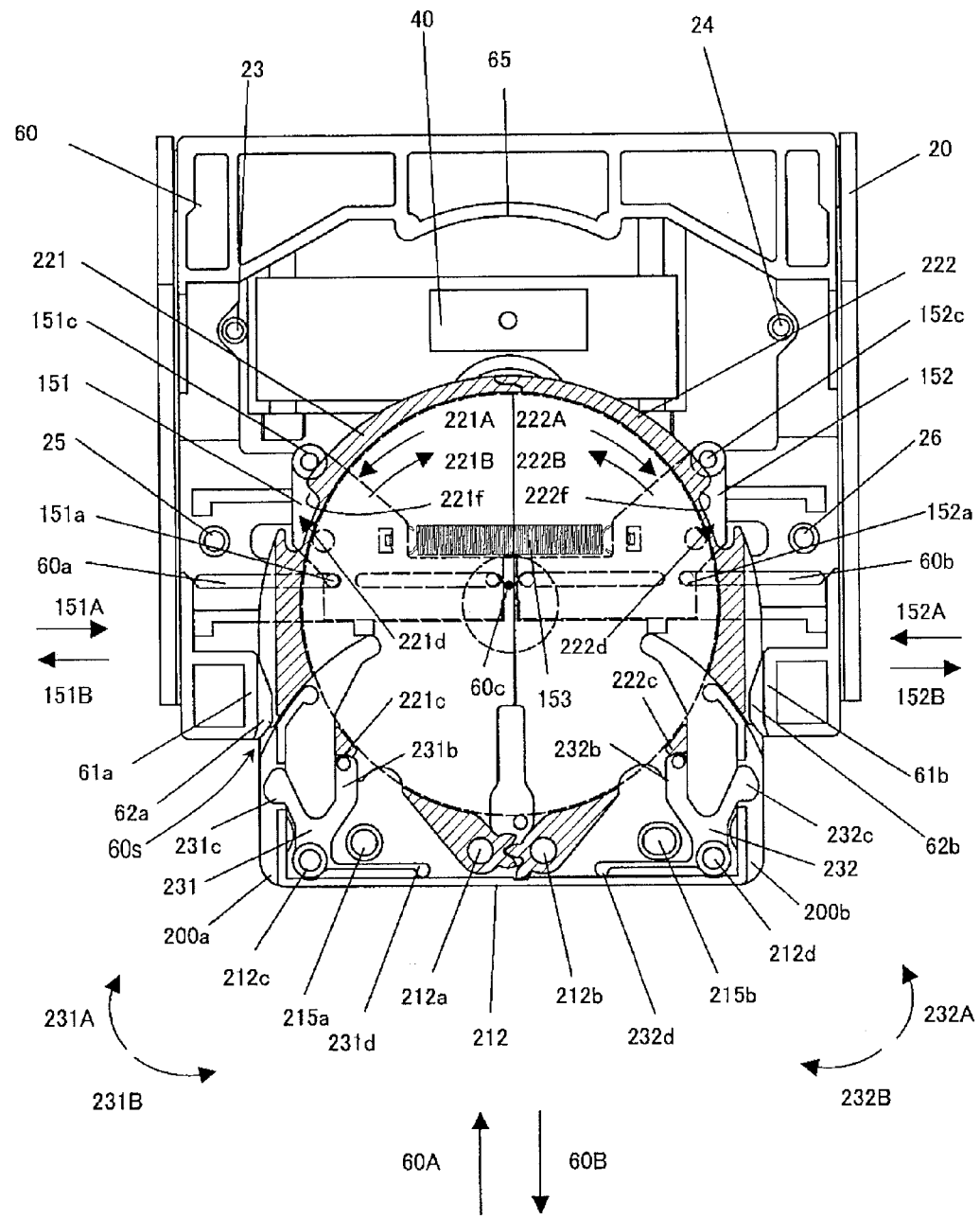
FIG. 4 is a plan view of one state during an opening operation or a closing operation of a cartridge open/close mechanism in the first embodiment.

As shown in FIG. 4, the operator inserts the disk cartridge 200 from the holder window 60s to the inside of the cartridge holder 60 as represented with arrow 60A. The disk cartridge 200 is inserted into the cartridge holder 60 while being guided by the guide walls 61a and 61b in terms of a width direction thereof which is perpendicular to the insertion direction (arrow 60A).

The first and second open/close sliders 151 and 152 are in contact with the stopper 60c and so are kept at the predetermined wait positions. At this point, the distance between the first and second engageable portions 151c and 152c of the first and second open/close sliders 151 and 152 is smaller than the distance between the guide walls 61a and 61b. Therefore, as the disk cartridge 200 is inserted deeper, the first and second engageable portions 151c and 152c contact outer profile surfaces of the first and second disk storage portions 221 and 222.

At this point, the unlock portions 62a and 62b provided on the guide walls 61a and 62a pass the unlock slits 200a and 200b of the disk cartridge 200.

Figure 5:
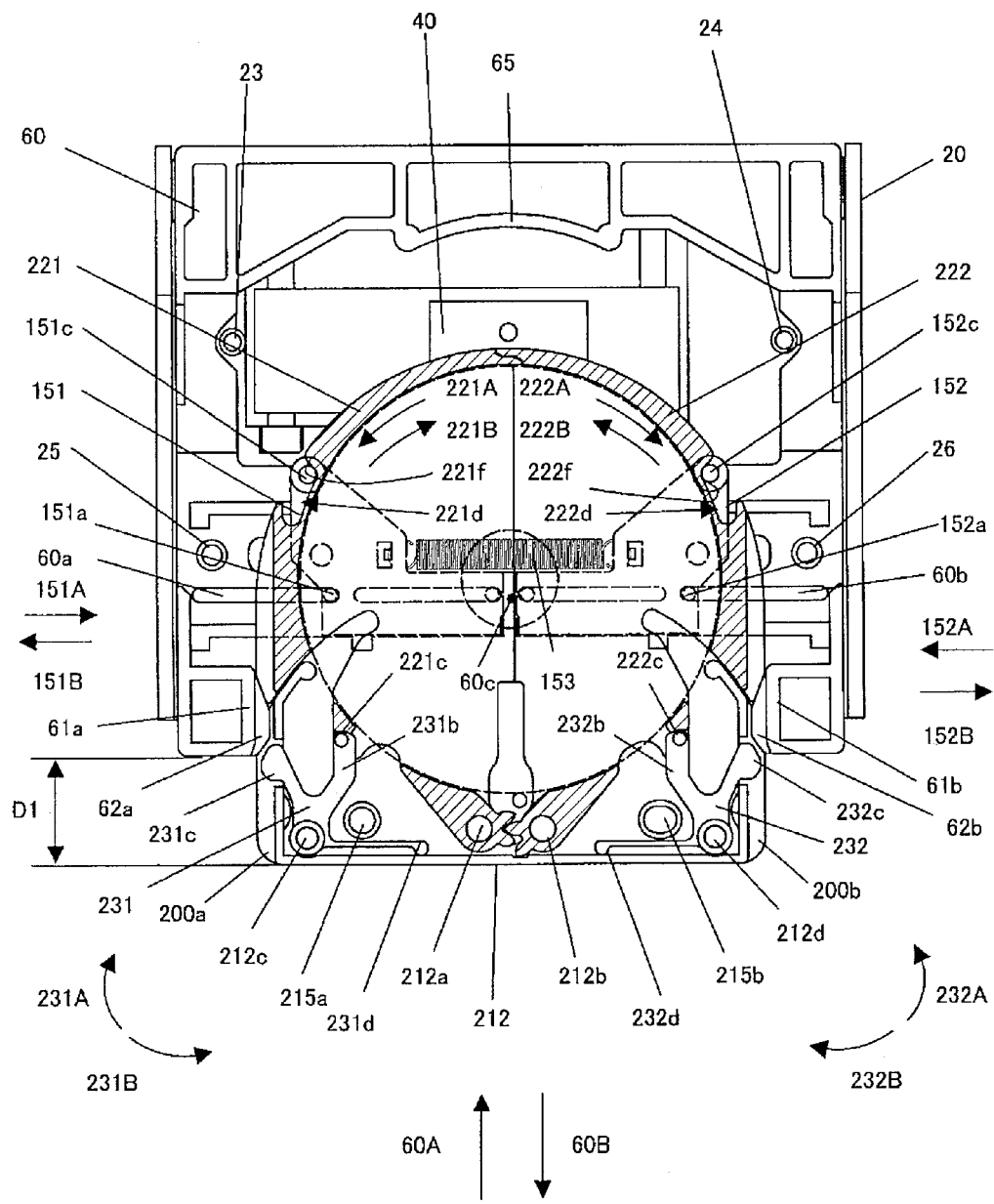
FIG. 5 is a plan view of one state during the opening operation or the closing operation of the cartridge open/close mechanism in the first embodiment.

When the disk cartridge 200 is inserted deeper in the direction of arrow 60A from the state shown in FIG. 4, as shown in FIG. 5, the first open/close slider 151 slides in the direction of arrow 151B along the first slider guide 60a against the loading force of the slider loading spring 153 because of the contact of the first engageable portion 151c and the outer profile surface of the first disk storage portion 221. Then, the first open/close slider 151 again slides in the direction of arrow 151A by the loading force of the slider loading spring 153, and the first engageable portion 151c is moved to a position where the first engageable portion 151c contacts a stop contact face 221f of the notch 221d of the first disk storage portion 221.

Similarly, the second open/close slider 152 slides in the direction of arrow 152B along the second slider guide 60b against the loading force of the slider loading spring 153 because of the contact of the second engageable portion 152c and the outer profile surface of the second disk storage portion 222. Then, the second open/close slider 152 again slides in the direction of arrow 152A by the loading force of the slider loading spring 153, and the second engageable portion 152c is moved to a position where the second engageable portion 152c contacts a stop contact face 222f of the notch 222d of the second disk storage portion 222.

Figure 6:
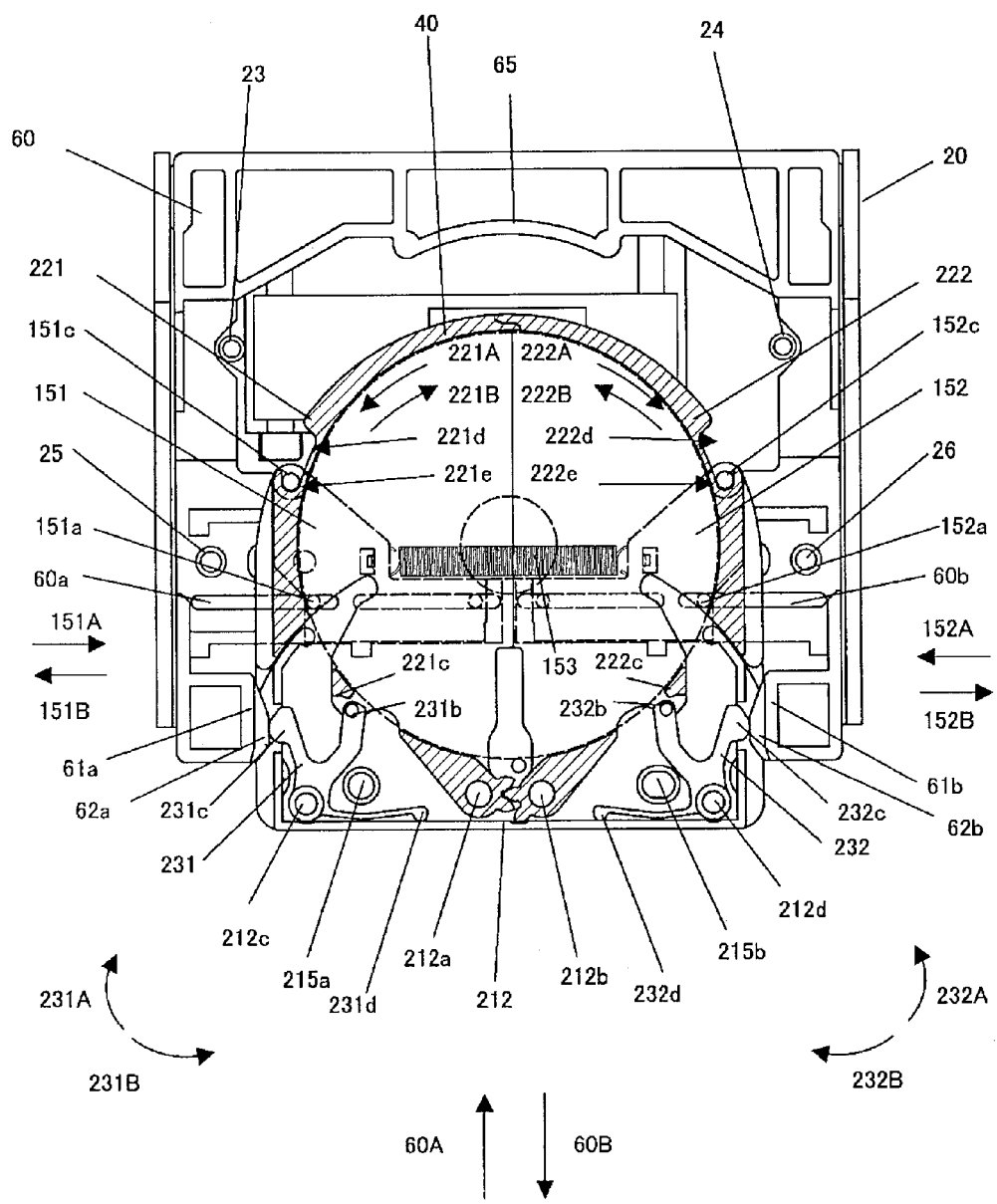
FIG. 6 is a plan view of one state during the opening operation or the closing operation of the cartridge open/close mechanism in the first embodiment.

When the disk cartridge 200 is inserted further deeper in the direction of arrow 60A from the state shown in FIG. 5, as shown in FIG. 6, the first engageable portion 151c of the first open/close slider 151 moves in contact with an inner wall of the notch 221d of the first disk storage portion 221 by the loading force of the slider loading spring 153, and reaches and is engaged with a semi-arc-shaped engageable portion 221e of the notch 221d. Thus, a first link mechanism is formed of the first open/close slider 151 and the first disk storage portion 221.

Similarly, the second engageable portion 152c of the second open/close slider 152 moves in contact with an inner wall of the notch 222d of the second disk storage portion 222 by the loading force of the slider loading spring 153, and reaches and is engaged with a semi-arc-shaped engageable portion 222e of the notch 222d. Thus, a second link mechanism is formed of the second open/close slider 152 and the second disk storage portion 222. The first link mechanism and the second link mechanism will be described later in more detail.

At this point, the unlock portions 62a and 62b press the operation portions 231c and 232c of the first and second lock members 231 and 232 at the same time to rotate the first and second lock members 231 and 232 in the directions of arrows 231A and 232A respectively while deforming the elastic portions 231d and 232d. Thus, the stop levers 231b and 232b of the first and second lock members 231 and 232 are separated from the stop portion 221c and 222c of the first and second disk storage portions 221 and 222, which releases the first and second disk storage portions 221 and 222 from the locked state. As a result, the first and second disk storage portions 221 and 222 are made rotatable in the directions of arrows 221A and 222A respectively.

Figure 7:
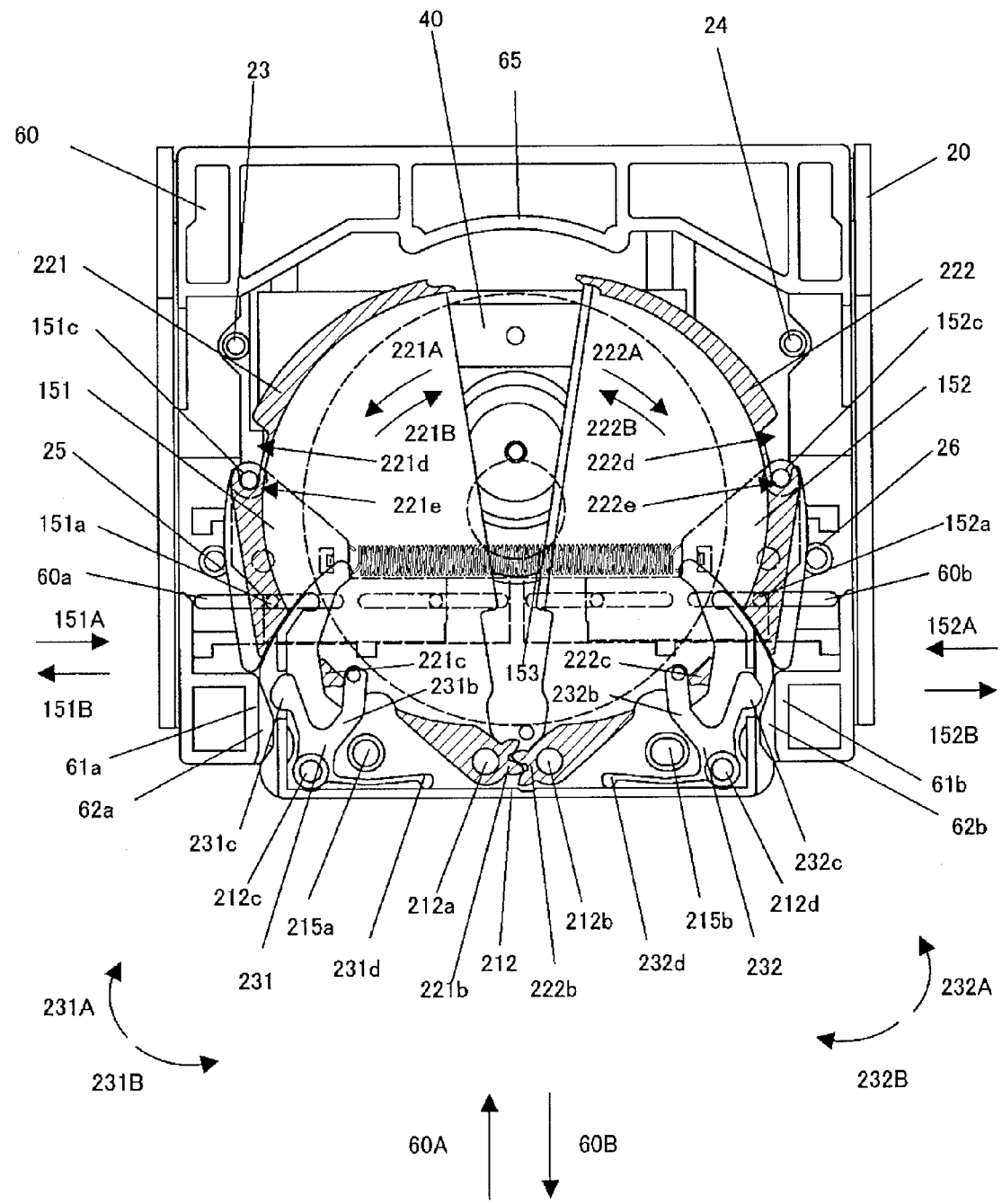
FIG. 7 is a plan view of one state during the opening operation or the closing operation of the cartridge open/close mechanism in the first embodiment.
Figure 8:
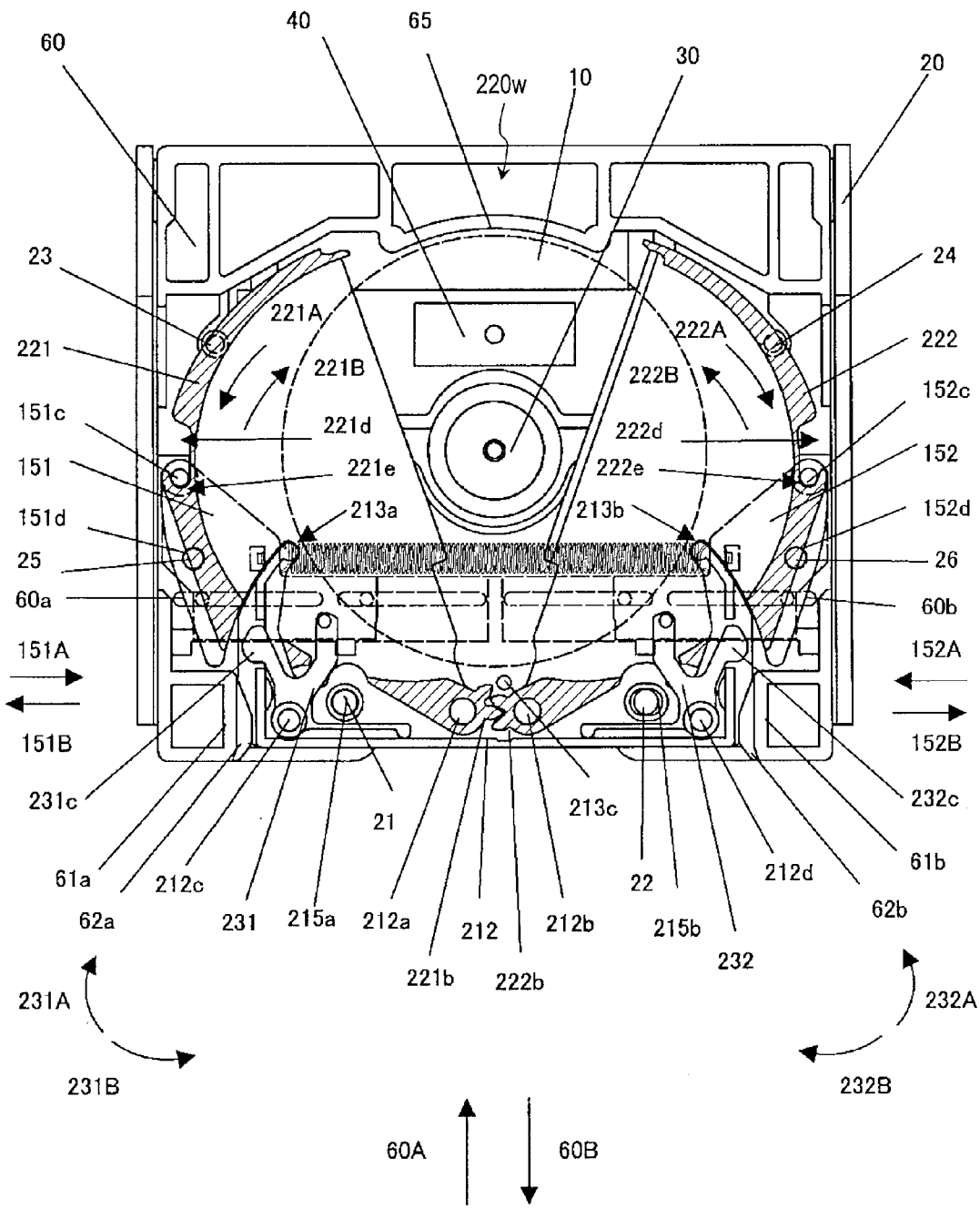
FIG. 8 is a plan view of one state during the opening operation or the closing operation of the cartridge open/close mechanism in the first embodiment.

When the disk cartridge 200 is inserted further deeper in the direction of arrow 60A from the state shown in FIG. 6, as shown in FIG. 7, the first and second open/close sliders 151 and 152 start sliding in the directions of arrows 151B and 152B along the first and second slider guides 60a and 60b respectively by the first link mechanism formed of the first open/close slider 151 and the first disk storage portion 221 and the second link mechanism formed of the second open/close slider 152 and the second disk storage portion 222. In association with this, the first and second disk storage portions 221 and 222 start rotating in the directions of arrows 221A and 222A around the rotation support shafts 212a and 212b respectively.

Specifically, the bottom support base member 212 of the disk cartridge 200 is guided in the direction of arrow 60A or 60B by the guide walls 61a and 61b. Therefore, the rotation support shaft 212a for the first disk storage portion 221 acts as a slider which is free to move only in the directions of arrows 60A and 60B. By contrast, the first open/close slider 151 is slidable along the first slider guide 60a. The two sliders performing a respective sliding operation are connected by the first disk storage portion 221 to form the first link mechanism.

When the operator inserts the disk cartridge 200 in the direction of arrow 60A, the rotation support shaft 212a for the first disk storage portion 221 slides in the direction of arrow 60A. Therefore, the first open/close slider 151 slides in the direction of arrow 151B by the first link mechanism. As a result, the first disk storage portion 221 is pivoted in the direction of arrow 221A.

Similarly, the bottom support base member 212 of the disk cartridge 200 is guided in the direction of arrow 60A or 60B by the guide walls 61a and 61b. Therefore, the rotation support shaft 212b for the second disk storage portion 222 acts as a slider which is free to move only in the directions of arrows 60A and 60B. By contrast, the second open/close slider 152 is slidable along the second slider guide 60b. The two sliders performing a respective sliding operation are connected by the second disk storage portion 222 to form the second link mechanism.

When the operator inserts the disk cartridge 200 in the direction of arrow 60A, the rotation support shaft 212b for the second disk storage portion 222 slides in the direction of arrow 60A. Therefore, the second open/close slider 152 slides in the direction of arrow 152B by the second link mechanism. As a result, the second disk storage portion 222 is pivoted in the direction of arrow 222A.

Accordingly, the first and second open/close sliders 151 and 152 slide in the directions of arrows 151B and 152B by the pair of link mechanisms in accordance with the distance by which the disk cartridge 200 is inserted in the direction of arrow 60A. In accordance with the sliding distance, the first and second disk storage portions 221 and 222 are rotated in the directions of arrows 221A and 222A respectively. Thus, the first and second disk storage portions 221 and 222 are opened.

At this point, the first and second disk storage portions 221 and 222 are associated to be rotated in the opposite directions to each other by the association portions 221b and 222b, which are engaged with each other. Therefore, the first and second open/close sliders 151 and 152 are associated to pivot in the opposite directions to each other via the first and second disk storage portions 221 and 222.

The first and second open/close sliders 151 and 152 are structured symmetrically with respect to the insertion direction of the disk cartridge 200 (arrow 60A). Accordingly, the first link mechanism formed of the first open/close slider 151 and the first disk storage portion 221, and the second link mechanism formed of the second open/close slider 152 and the second disk storage portion 222, operate symmetrically with respect to the insertion direction of the disk cartridge 200 (arrow 60A). Owing to this, the moving linearity of the disk cartridge 200 in the insertion direction is guaranteed during the insertion of the disk cartridge 200.

Elements in the vicinity of the first and second engageable portions 151c and 152c of the first and second open/close sliders 151 and 152 contact and thus support the bottom surfaces of the first and second disk storage portions 221 and 222. Thus, such elements guide the first and second disk storage portions 221 and 222 in terms of the height direction during the operation of inserting the disk cartridge 200 in the direction of arrow 60A.

In this manner, while being inserted in the direction of arrow 60A, the disk cartridge 200 is guaranteed to move linearly by the first and second open/close sliders 151 and 152 structured symmetrically, and also guided in terms of the height direction. As a result, the disk storage portion 220 can be opened stably.

When the disk cartridge 200 is inserted further deeper in the direction of arrow 60A from the state shown in FIG. 7, as shown in FIG. 8, the disk cartridge 200 is inserted to the inside of the cartridge holder 60 and the first and second disk storage portions 221 and 222 are pivoted to a predetermined angle. As a result, the window 220w is formed in the disk cartridge 200.

At this point, the positioning member 65 provided in the cartridge holder 60 enters the window 220w. The position of the disk 10 is restricted by the position restriction portions 213a, 213b and 213c of the bottom support base member 212 and the positioning member 65, and thus the center of the disk 10 when the window 220w is opened is determined.

When the operator pivots the cartridge holder 60 in the direction of arrow 80B from the state of being slanted by predetermined angle θ with respect to the traverse base 20 as shown in FIG. 3A to the state where writing/reading is possible as shown in FIG. 3B, the cartridge positioning pins 21 and 22 on the traverse base 20 are engaged with the positioning holes 215a and 215b of the bottom support base member 212. Thus, the bottom support base member 212 is positioned with respect to the traverse base 20. At the same time, the rotation support shafts 212a and 212b, which are pivoting shafts for the first and second disk storage portions 212 and 222, are positioned with respect to the traverse base 20.

As a result, the rotation support shaft 212a, which has been movable in the directions of arrows 60A and 60B as a pivoting axis for the first disk storage portion 221, is positioned and restricted. Therefore, the first open/close slider 151, which has been slidable in the directions of arrows 151A and 151B along the first slider guide 60a, is also restricted in terms of the sliding operation. Accordingly, the engageable portion 221e of the first disk storage portion 221 in engagement with the first engageable portion 151c of the first open/close slider 151 is uniquely positioned with respect to the traverse base 20.

Similarly, the rotation support shaft 212b, which has been movable in the directions of arrows 60A and 60B as a pivoting axis for the second disk storage portion 222, is positioned and restricted. Therefore, the second open/close slider 152, which has been slidable in the directions of arrows 151A and 151B along the second slider guide 60b, is also restricted in terms of the sliding operation. Accordingly, the engageable portion 222e of the second disk storage portion 222 in engagement with the second engageable portion 152c of the second open/close slider 152 is uniquely positioned with respect to the traverse base 20.

Namely, by positioning the bottom support base member 212 with respect to the traverse base 20, the first and second open/close sliders 151 and 152 and the first and second disk storage portions 221 and 222 are uniquely positioned with respect to the traverse base 20 by the first and second link mechanisms. Accordingly, the positions and the rotating angles of the pivoting axes for the first and second disk storage portions 221 and 222 are uniquely determined and the window 220w is completely opened.

It should be noted that because the first and second open/close sliders 151 and 152 are loaded in the directions of arrows 151A and 152A by the slider loading spring 153, the first and second disk storage portions 221 and 222 are positioned while being loaded in the direction of being closed. As a result, in consideration of the precision variance of the elements, engagement instability of the positioning pins or the like, the area of the window 220w may be possibly varied in the direction of being narrowed and the window 220w may not be fully opened.

In this embodiment, in order to avoid this, the slider positioning pins 25 and 26 on the traverse base 20 are engaged with the positioning holes 151d and 152d of the first and second open/close sliders 151 and 152 to position the first and second open/close sliders 151 and 152. Owing to this, the first and second disk storage portions 221 and 222 can be opened with higher precision and the window 220w of a predetermined size can be formed with certainty.

At this point, the distance between the first and second engageable portions 151c and 152c of the first and second open/close sliders 151 and 152 is larger than the distance between the guide walls 61a and 61b. This allows the first and second disk storage portions 221 and 222 to be extended beyond the projected area of the disk cartridge 200 in the state where the disk storage portion 220 is closed, and thus allows the window 220w of a large size to be formed in the disk cartridge 200.

The engageable portions 221e and 222e of the first and second disk storage portions 221 and 222 have restricting contact surfaces which contact the first and second engageable portions 151c and 152c of the first and second open/close sliders 151 and 152 when the first and second open/close sliders 151 and 152 slide in the directions of arrows 151B and 152B respectively. Owing to this, once the first and second open/close sliders 151 and 152 are positioned with respect to the traverse base 20, the first and second disk storage portions 221 and 222 are restricted from being pivoted in the directions of arrows 221B and 222B by the contact of the first and second engageable portions 151c and 152c and the restricting contact surfaces. As a result, the first and second disk storage portions 221 and 222 can be positioned with high precision and the window 220w can be inhibited from being narrowed.

Because the first and second open/close sliders 151 and 152 are engaged with the slider positioning pins 25 and 26 on the traverse base 20, the first and second disk storage portions 221 and 222 are held by the traverse base 20 via the first and second open/close sliders 151 and 152. Therefore, even against vibration, impact or other external disturbances, the window 220w can be guaranteed to have a certain area.

The disk 10 is clamped by the disk placing surface 30a of the disk motor 30 and the clamper 50 (not shown in FIG. 8) and so is made rotatable. At this point, the position restriction portions 213a, 213b and 213c of the bottom support base member 212 are also positioned with respect to the traverse base 20. Therefore, the position restriction portions 213a, 213b and 213c are guaranteed to have a necessary clearance with respect to the disk 10. The positioning portion 65 of the cartridge holder 60, which is supported by the shaft screws 81 and 82 with respect to the traverse base 20, is supported with high precision.

The bottom surface of the bottom support base member 212 is supported by the seats 21a and 22a of the cartridge positioning pins 21 and 22, and the bottom surfaces of the first and second disk storage portions 221 and 222 are supported by the seats 23a and 24a of the fixed pins 23 and 24 provided on the traverse base 20. At this point, the elements in the vicinity of the first and second engageable portions 151c and 152c, which have been in contact with the bottom surfaces of the first and second disk storage portions 221 and 222 and guiding the first and second disk storage portions 221 and 222 in terms of the height direction, are separated from the bottom surfaces thereof.

Accordingly, in the state where writing data on, or reading data from, the disk 10 is possible, the disk cartridge 200 is supported in the height direction only by the four seats mentioned above. Therefore, the disk cartridge 200 is positioned with respect to the traverse base 20 with high precision and is guaranteed to have a necessary clearance with respect to the disk 10. In the case where a loading spring (not shown) for pressing the disk cartridge 200 to the four seats is provided, the positioning precision in the height direction can be further improved.

As shown in FIG. 8, in the state where writing data on, or reading data from, the disk 10 is possible, the unlock portions 62a and 62b are separated from the operation portions 231c and 232c of the first and second lock members 231 and 232. Therefore, the elastic portions 231d and 232d of the first and second lock members 231 and 232 are not elastically deformed. Owing to this, the elastic portions 231d and 232d can be prevented from creeping even where the first and second lock members 231 and 232 are each integrally formed of a resin.

Figure 24:
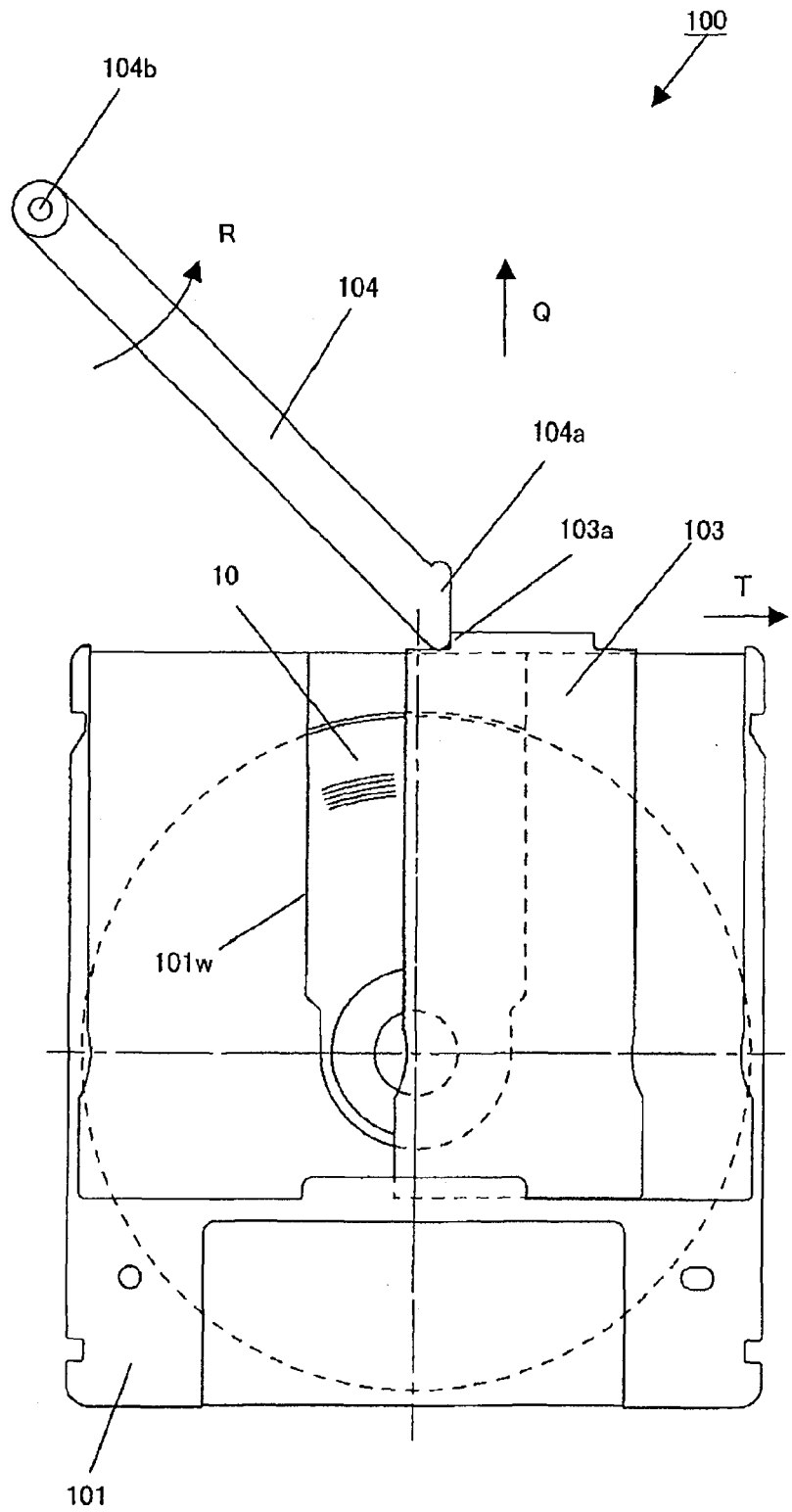
FIG. 24 is a plan view of a conventional disk cartridge, showing a general structure and one state during an opening/closing operation of a cartridge shutter.

When the disk cartridge 200 is inserted in the direction of arrow 60A into the disk apparatus 501, it is common to provide a slight overstroke in the direction of arrow 60A for this type of disk apparatus. Therefore, when the center of the disk 10 is positioned only by the support base 101 as in the case of the conventional disk cartridge 100 shown in FIG. 24, the disk 10 is positioned deeper in the insertion direction by the overstroke. As a result, the positioning precision may be varied in accordance with the insertion state.

By contrast, with the disk apparatus 501 according to the present invention, the positioning member 65 for positioning the center of the disk 10 is provided in the cartridge holder 60, at a position beyond the disk 10 in the insertion direction, i.e., on the disk apparatus 501 side. Therefore, even if the insertion degree of the disk cartridge 200 may be varied in the direction of arrow 60A, the disk 10 can be positioned with respect to the disk apparatus 501 with high precision.

As described above, by inserting the disk cartridge 200 in the direction of arrow 60A and changing the state shown in FIG. 4 to the state shown in FIG. 8, the window 220w of the disk cartridge 200 is completely opened. Thus, the opening operation of the cartridge open/close mechanism 150 is completed. The disk cartridge 200 is properly mounted on the disk apparatus 501 so that writing data on, or reading data from, the disk 10 is possible.

Next, a closing operation of the cartridge open/close mechanism 150 when the disk cartridge 200 is ejected from the cartridge holder 60 will be described.

The closing operation of the cartridge open/close mechanism 150 is performed oppositely to the opening operation of the cartridge open/close mechanism 150 described above. That is, the operation starts with the state shown in FIG. 8, which is changed to the state shown in FIG. 4 by the operation of ejecting the disk cartridge 200 in the direction of arrow 60B. In the state shown in FIG. 4, the disk storage portion 220 is completely closed. Then, the disk cartridge 200 is ejected out of the disk apparatus 501.

Hereinafter, with respect to FIG. 8 through FIG. 4, the closing operation of the cartridge open/close mechanism 150 will be specifically described.

As shown in FIG. 8, in the state where the disk cartridge 200 is property mounted on the disk apparatus 501, the operator pivots the cartridge holder 60 in the direction of arrow 80A from the state shown in FIG. 3B to the state shown in FIG. 3A where the disk cartridge 200 can be inserted or ejected. Thus, the cartridge positioning pins 21 and 22, which have been in engagement with the positioning holes 215a and 215b of the bottom support base member 212, are disengaged therefrom, and the slider positioning pins 25 and 26, which have been in engagement with the positioning holes 151d and 152d of the first and second open/close sliders 151 and 152, are disengaged therefrom. As a result, the slidable elements included in the first and second link mechanisms (the first and second open/close sliders 151 and 152 and the rotation support shafts 212a and 212b for the first and second disk storage portions 221 and 222) are released from the restricted state. The disk cartridge 200 is made movable in the directions of arrows 60A and 60B along the guide walls 61a and 61b of the cartridge holder 60. The first and second open/close sliders 151 and 152 start sliding in the directions of arrows 151A and 152A respectively by the loading force of the slider loading spring 153.

Opposite to the opening operation, as the first and second open/close sliders 151 and 152 move in the directions of arrows 151A and 152A respectively, the first and second disk storage portions 221 and 222 are pivoted in the directions of arrows 221B and 222B respectively by the link mechanisms with the first and second open/close sliders 151 and 152. Thus, the operation of closing the disk storage portion 220 is started.

When the first and second open/close sliders 151 and 152 slide in the directions of arrows 151A and 152A by the loading force of the slider loading spring 153 from the state shown in FIG. 8, as shown in FIG. 7, the disk cartridge 200 closes the disk storage portion 220 by the action of the link mechanisms formed of the first and second open/close sliders 151 and 152 and the first and second disk storage portions 221 and 222, while being guided by the guide walls 61*a* and 61*b* to be ejected in the direction of arrow 60B.

At this point, like in the opening operation described above, the first and second disk storage portions 221 and 222 are associated to be rotated in opposite directions to each other by the association portions 221*b* and 222*b*. The first and second open/close sliders 151 and 152 are structured symmetrically with respect to the ejection direction of the disk cartridge 200 (arrow 60B). For these reasons, the disk cartridge 200 is guaranteed to move linearly when being ejected.

Like in the opening operation described above, the elements in the vicinity of the first and second engageable portions 151*c* and 152*c* of the first and second open/close sliders 151 and 152 contact and thus support the bottom surfaces of the first and second disk storage portions 221 and 222. Thus, such elements guide the first and second disk storage portions 221 and 222 in terms of the height direction during the operation of ejecting the disk cartridge 200 in the direction of arrow 60B.

At this point, the first and second lock members 231 and 232 of the disk cartridge 200 are not in contact with the unlock portions 62*a* and 62*b*. However, because the first and second disk storage portions 221 and 222 are pivoted in the directions of arrows 221B and 222B, the stop portions 221*c* and 222*c* of the first and second disk storage portions 221 and 222 contact the stop levers 231*b* and 232*b* of the first and second lock members 231 and 232 to pivot the first and second lock members 231 and 232 in the directions of arrows 231A and 232A.

When the disk cartridge 200 is further ejected in the direction of arrow 60B by the loading force of the slider loading spring 153 from the state shown in FIG. 7, the first and second open/close sliders 151 and 152 keep sliding in the directions of arrows 151A and 152A respectively. Owing to this, the first and second disk storage portions 221 and 222 are pivoted in the directions of arrows 221B and 222B respectively. As a result, as shown in FIG. 6, the window 220*w* is completely closed by the disk storage portion 220.

At this point, the unlock portions 62*a* and 62*b* contact the operation portions 231*c* and 232*c* of the first and second lock members 231 and 232 to pivot the first and second lock members 231 and 232 in the directions of arrows 231A and 232A respectively. Therefore, the stop portions 221*c* and 222*c* of the first and second disk storage portions 221 and 222 are separated from the stop levers 231*b* and 232*b* of the first and second lock members 231 and 232. As a result, the first and second disk storage portions 221 and 222 are not locked.

When the first and second open/close sliders 151 and 152 keep sliding in the directions of arrows 151A and 152A respectively by the loading force of the slider loading spring 153 from the state shown in FIG. 6, the first and second engageable portions 151*c* and 152*c* of the first and second open/close sliders 151 and 152 ejection the disk cartridge 200 in the direction of arrow 60B while being in contact with the inner walls of the notches 221*d* and 222*d* of the first and second disk storage portions 221 and 222.

As shown in FIG. 5, the first and second engageable portions 151*c* and 152*c* of the first and second open/close sliders 151 and 152 contact the stop contact faces 221*f* and 222*f* of the notches 221*d* and 222*d*. In this manner, the operation for ejecting the disk cartridge 200 in the direction of arrow 60B by the loading force of the slider loading spring 153 is completed.

The contact of the first and second engageable portions 151*c* and 152*c* with the stop contact faces 221*f* and 222*f* prevents the disk cartridge 200 from jumping in the direction of arrow 60B by the loading force of the slider loading spring 153 and thus from coming off from the disk apparatus 501.

At this point, the operation portions 231*c* and 232*c* of the first and second lock members 231 and 232 are separated from the unlock portions 62*a* and 62*b*. Therefore, the first and second lock members 231 and 232 are pivoted in the directions of arrows 231B and 232B by the elastic force of the elastic portions 231*d* and 232*d* respectively. As a result, the stop portions 221*c* and 222*c* of the first and second disk storage portions 221 and 222 are engaged with the stop levers 231*b* and 232*b* of the first and second lock members 231 and 232. This locks the first and second disk storage portions 221 and 222 so as not to be rotated in the directions of 221A and 222B.

When the operator pulls the disk cartridge 200 in the direction of arrow 60B from the state shown in FIG. 5, the first and second open/close sliders 151 and 152 slide in the directions of arrows 151B and 152B against the loading force of the slider loading spring 153. Thus, the first and second engageable portions 151*c* and 152*c* of the first and second open/close sliders 151 and 152 move while sliding on the stop contact faces 221*f* and 222*f* of the first and second disk storage portions 221 and 222.

Then, as shown in FIG. 4, the first and second engageable portions 151*c* and 152*c* contact the outer profile surfaces of the first and second disk storage portions 221 and 222 and are disengaged from the stop contact faces 221*f* and 222*f* of the first and second disk storage portions 221 and 222. Thus, the disk cartridge 200 is released from the held state. This allows the disk cartridge 200 to be removed out of the cartridge holder 60.

Then, when the operator removes the disk cartridge 200 in the direction of arrow 60B, the disk cartridge 200 is completely ejected from the cartridge holder 60. In this manner, the closing operation of the cartridge open/close mechanism 150 is completed.

In the case where the loading force of the slider loading spring 153 is sufficiently large, as described above, the first and second open/close sliders 151 and 152 slide in the directions of arrows 151A and 152A respectively to move the disk cartridge 200 from the state in FIG. 6 to the state in FIG. 5. By contrast, when the frictional force between the first and second engageable portions 151*c* and 152*c* of the first and second open/close sliders 151 and 152 and the inner walls of the notches 221*d* and 222*d* of the first and second disk storage portions 221 and 222 is larger than the loading force of the slider loading spring 153, the ejection of the disk cartridge 200 in the direction of arrow 60B by the slider loading spring 153 may possibly be terminated in the state shown in FIG. 6. In such a case, the ejection degree of the disk cartridge 200 from the cartridge holder 60 is smaller, but the operator can remove the disk cartridge 200 in the direction of arrow 60B to realize the state shown in FIG. 4 via the state shown in FIG. 5. Therefore, the disk cartridge 200 can be removed from the cartridge holder 60 with no problem.

As described above, the disk apparatus according to the present invention utilizes the link mechanisms to open or close the first and second disk storage portions 221 and 222 in synchronization with the insertion or ejection of the disk cartridge 200. The operation of the link mechanisms will be described in more detail.

Figure 9:
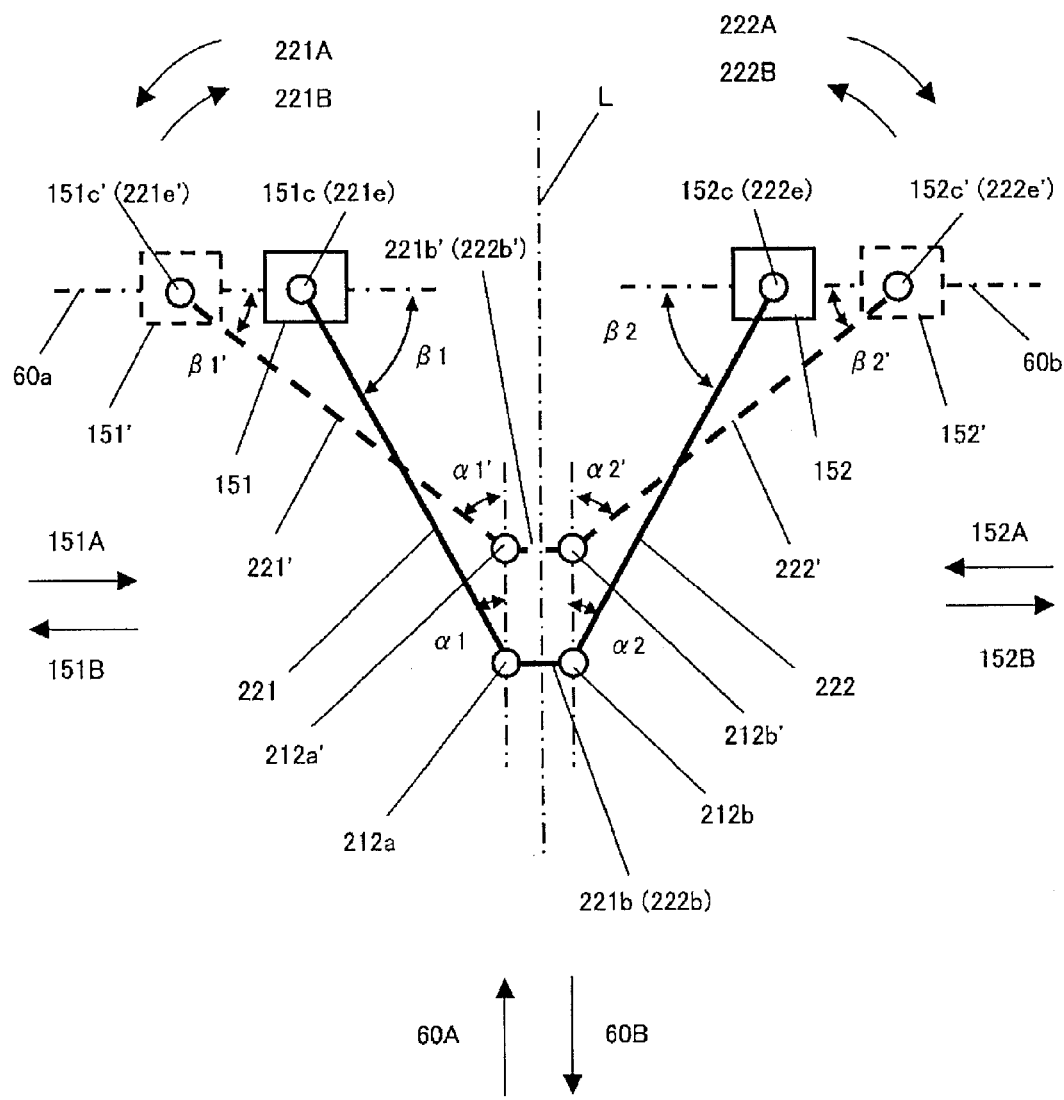
FIG. 9 is a schematic view of link mechanisms showing an operation principle of the cartridge open/close mechanism in the first embodiment.

FIG. 9 is a schematic view of link mechanisms showing an operation principle of the cartridge open/close mechanism 150 in the disk apparatus according to the present invention.

In FIG. 9, identical elements to those in FIG. 4 through FIG. 8 bear identical reference numerals thereto. The elements are schematically shown. In FIG. 9, the state of the first and second open/close sliders 151 and 152 and the first and second disk storage portions 221 and 222 represented with the solid line corresponds to the state shown in FIG. 6. The state of the first and second open/close sliders 151 and 152 and the first and second disk storage portions 221 and 222 represented with the dashed line corresponds to the state shown in FIG. 8. The reference numerals with "'", for example, "151'", denote the respective element in the state represented with the dashed line (state in FIG. 8). Line segment L represents a plane which is parallel to the directions of arrows 60A and 60B and includes the rotation axis of the disk 10.

As shown with the solid line in FIG. 9, by the engagement of the first engageable portion 151c of the first open/close slider 151 and the engageable portion 221e of the first disk storage portion 221, the first link mechanism is formed of the first open/close slider 151 and the first disk storage portion 221. Similarly, by the engagement of the second engageable portion 152c of the second open/close slider 152 and the engageable portion 222e of the second disk storage portion 222, the second link mechanism is formed of the second open/close slider 152 and the second disk storage portion 222. Since the first and second open/close sliders 151 and 152 and the first and second disk storage portions 221 and 222 are structured symmetrically with respect to the line segment L, the first and second link mechanisms are also structured symmetrically with respect to the line segment L.

In the first and second link mechanisms, the first and second open/close sliders 151 and 152 are sliders slidable along the first and second slider guides 60a and 60b. The rotation support shafts 212a and 212b for the first and second disk storage portions 221 and 222 are support shafts of the link mechanisms acting as sliders which are free to move in the directions of arrows 60A and 60B when the bottom support base member 212 is guided in the directions of arrows 60A and 60B by the guide walls 61a and 61b. Accordingly, the first and second link mechanisms operate as link mechanisms connecting two sliders via connecting links (two-slider crank mechanisms).

When the disk cartridge 200 is inserted, the rotation support shafts 212a and 212b move in the direction of arrow 60A to reach the positions of the rotation support shafts 212a' and 212b'. When the rotation support shaft 212a reaches the position of the rotation support shaft 212a', the first open/close slider 151 slides in the direction of arrow 151B along the first slider guide 60a. As a result, the first engageable portion 151c (engageable portion 221e) moves to the position of the first engageable portion 151c' (engageable portion 221e'). Along with this, the first disk storage portion 221 acting as a connecting link moves in the direction of arrow 60A while pivoting in the direction of arrow 221A. In this manner, the first link mechanism moves to the state represented with the dashed line.

Similarly, when the rotation support shaft 212b reaches the position of the rotation support shaft 212b' in the direction of arrow 60A, the second open/close slider 152 slides in the direction of arrow 152B along the second slider guide 60b. As a result, the second engageable portion 152c (engageable portion 222e) moves to the position of the second engageable portion 152c' (engageable portion 222e'). Along with this, the second disk storage portion 222 acting as a connecting link moves in the direction of arrow 60A while pivoting in the direction of arrow 222A. In this manner, the second link mechanism moves to the state represented with the dashed line.

At this point, the first and second disk storage portions 221 and 222 are associated to be rotated in the opposite directions to each other by the association portions 221b and 222b, which are engageable with each other. Therefore, in FIG. 9, the angles made by the first and second disk storage portions 221 and 222 and the insertion/ejection direction have the relationship of $\alpha 1=\alpha 2$ in the state represented with the solid line, and the relationship of $\alpha 1'=\alpha 2'$ in the state represented with the dashed line. Because the first and second link mechanisms are structured symmetrically with respect to the line segment L, the angles made by the first and second disk storage portions 221 and 222 and the slider guides 60a and 60b also have the relationship of $\beta 1=\beta 2$ in the state represented with the solid line, and the relationship of $\beta 1'=\beta 2'$ in the state represented with the dashed line.

Accordingly, the first link mechanism formed of the first open/close slider 151 and the first disk storage portion 221, and the second link mechanism formed of the second open/close slider 152 and the second disk storage portion 222, operate symmetrically with respect to the insertion direction of the disk cartridge 200 (direction of arrow 60A). Owing to this, the disk cartridge 200 is guaranteed to move linearly in the insertion direction during the operation of inserting the disk cartridge 200.

In the operation of ejecting the disk cartridge 200, the first and second open/close sliders 151 and 152 slide along the first and second slider guides 60a and 60b by the loading force of the slider loading spring 153. Therefore, the first and second engageable portions 151c' and 152c' (engageable portions 221e' and 222e') move in the directions of arrows 151A and 152A, i.e., oppositely to the insertion operation, and reach the positions of the first and second engageable portions 151c and 152c (engageable portions 221e and 222e).

When the first engageable portion 151c' (engageable portion 221e') moves in the direction of arrow 151A and reaches the position of the first engageable portion 151c (engageable portion 221e), the rotation support shaft 212a moves in the direction of arrow 60B. Along with this, the first disk storage portion 221 acting as a connecting link moves in the direction of arrow 60B while pivoting in the direction of arrow 221B. In this manner, the first link mechanism moves to the state represented with the solid line.

Similarly, when the second engageable portion 152c' (engageable portion 222e') moves in the direction of arrow 152A and reaches the position of the second engageable portion 152c (engageable portion 222e), the rotation support shaft 212b moves in the direction of arrow 60B. Along with this, the second disk storage portion 222 acting as a connecting link moves in the direction of arrow 60B while pivoting in the direction of arrow 222B. In this manner, the second link mechanism moves to the state represented with the solid line.

Like in the insertion operation, in FIG. 9, the angles made by the first and second disk storage portions 221 and 222 and the insertion/ejection direction have the relationship of $\alpha 1=\alpha 2$ in the state represented with the solid line, and the relationship of $\alpha 1'=\alpha 2'$ in the state represented with the dashed line. Because the first and second link mechanisms are structured symmetrically with respect to the line segment L, the angles made by the first and second disk storage portions 221 and 222 and the slider guides 60a and 60b also have the relationship of $\beta 1=\beta 2$ in the state represented with the solid line, and the relationship of $\beta 1'=\beta 2'$ in the state represented with the dashed line.

Accordingly, the first link mechanism formed of the first open/close slider 151 and the first disk storage portion 221, and the second link mechanism formed of the second open/close slider 152 and the second disk storage portion 222, operate symmetrically with respect to the ejection direction of the disk cartridge 200 (direction of arrow 60B). Owing to this, the disk cartridge 200 is guaranteed to move linearly in the ejection direction during the operation of ejecting the disk cartridge 200.

As described above, because the first and second link mechanisms are structured symmetrically with respect to the insertion/ejection direction (line segment L) and driven in synchronization with each other via the disk storage portion 220, the disk cartridge 200 are inserted/ejected stably. At the same time, the disk storage portion 220 can be opened/closed.

The first and second disk storage portions 221 and 222 of the disk cartridge 200 can be associated to be pivoted in the opposite directions to each other by the association portions 221b and 222b included in the first and second disk storage portions 221 and 222. Owing to this, even where the cartridge open/close mechanism 150 has only one open/close slider, the disk storage portion 220 of the disk cartridge 200 can be opened/closed theoretically.

However, when the window 220w is opened, the disk storage portion 220 having the function of a housing of the disk cartridge 200 is pivoted, which enlarges the projected area of the disk cartridge 200. For this reason, the guide walls 61a and 61b for guiding the outer profile surfaces of the disk cartridge 200 for insertion/ejection can only be provided in the vicinity of the holder window 60s of the disk apparatus 501. Therefore, as described later, in order to stably insert or ejection the disk cartridge 200, it is preferable to guide the disk storage portion 220 which is a tip portion of the disk cartridge 200.

Figure 10:
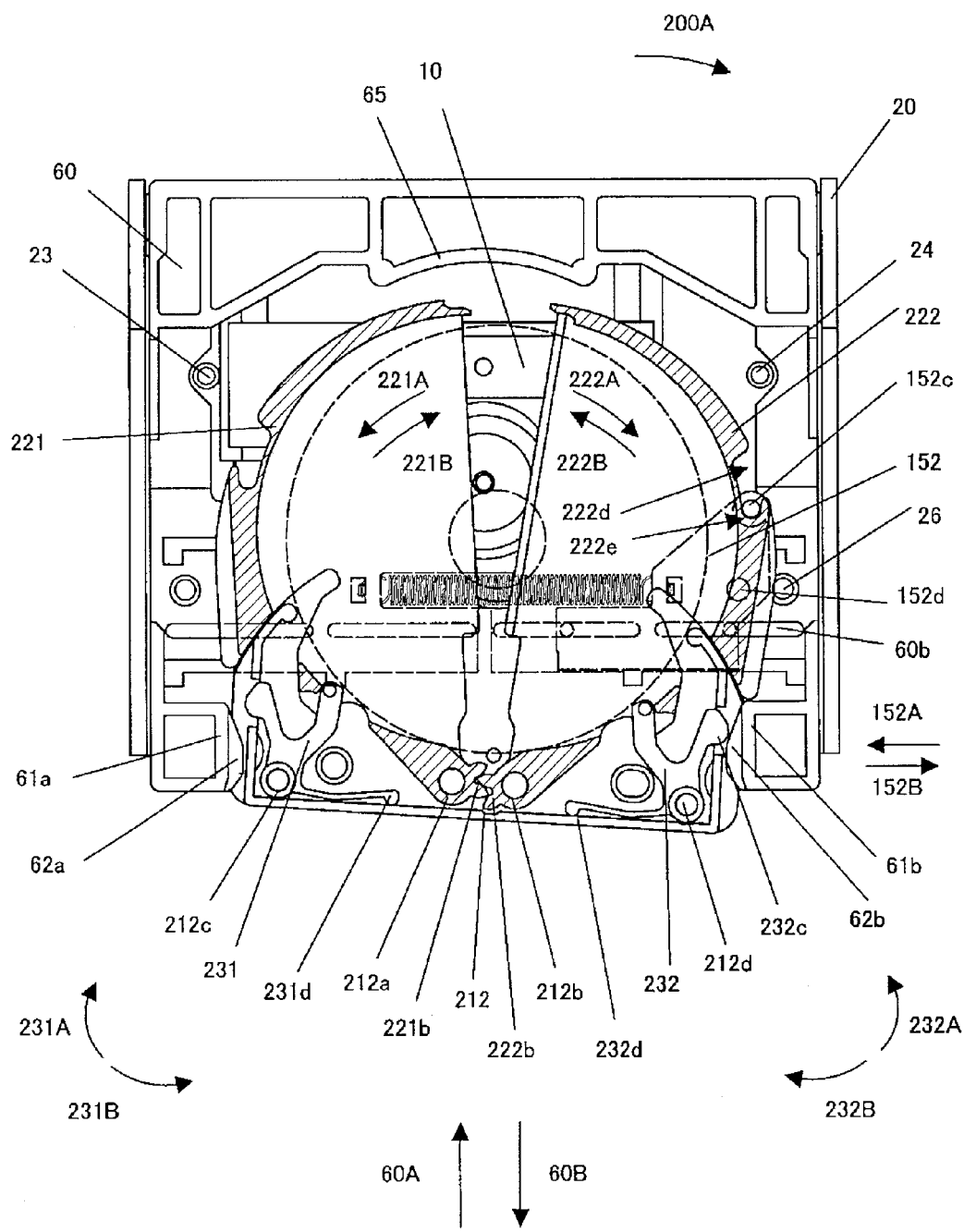
FIG. 10 is a plan view of one state during an opening operation of a cartridge open/close mechanism, in the case where the cartridge open/close mechanism includes one open/close slider.

FIG. 10 shows an operation of a disk apparatus in which the cartridge open/close mechanism includes only the second open/close slider 152 with the first open/close slider 151 being removed.

Referring to FIG. 10, the operator inserts the disk cartridge 200 in the direction of arrow 60A. At this point, owing to the engagement of the second engageable portion 152c of the second open/close slider 152 and the engageable portion 222e of the second disk storage portion 222, the second open/close slider 152 slides in the direction of arrow 152B to pivot the second disk storage portion 222 in the direction of arrow 222A. Along with this, the first disk storage portion 221 is also pivoted in the direction of arrow 221A by the engagement of the association portions 221a and 221b.

However, the disk cartridge 200 is guided to be movable in the direction of arrow 60A only by the guide walls 61a and 61b of the cartridge holder 60. Therefore, in a deeper area of the disk apparatus 501, only the second disk storage portion 222 is supported by the second open/close slider 152.

When the operator inserts the disk cartridge 200 in the direction of arrow 60A, the second disk storage portion 222 forms a link mechanism with the second open/close slider 152. Therefore, the second disk storage portion 222 is stably supported and is pivoted in the direction of arrow 222A. By contrast, the first disk storage portion 221 is pivoted in the direction of arrow 221A by the engagement of the association portions 221b and 222b. However, the first disk storage portion 221 is not sufficiently guided due to the absence of the first open/close slider 151. This makes the load acting on the first disk storage portion 221 and the load acting on the second disk storage portion 222 non-uniform.

As a result, as represented with arrow 200A, the disk cartridge 200 is inserted while being slanted toward the second disk storage portion 222 subjected to a larger load. It is difficult to property insert the disk cartridge 200. It is also difficult to property open the disk storage portion 220.

Even if the disk cartridge 200 is property inserted, the first storage portion 221 is positioned when being opened only by the engagement of the association portions 221b and 222b although the second disk storage portion 222 is property positioned with respect to the traverse base 20 by the engagement with the second open/close slider 152 as described above. As a result, the opening precision of the window 220w is significantly decreased.

The reason is as follows. Because the association portion 221b is located in the vicinity of the rotation support shaft 212a, an error due to a slight instability of engagement is significantly enlarged at the tip of the first disk storage portion 221. In addition, the disk storage portion 221, which is held only by the engagement of the association portions 221b and 222b, is likely to be rotated in the direction of arrow 221A or 222A due to external disturbance. This also decreases the opening precision.

For the above-described reasons, where the disk storage portion 220 is opened or closed only by one open/close slider, the insertion/ejection operation of the disk cartridge 200 is destabilized and the opening precision of the window 220w is decreased. Therefore, such a structure is not preferable as the cartridge open/close mechanism 150 of the disk cartridge 200 for opening or closing the window 220w using the first and second disk storage portions 221 and 222 having both the function of a shutter and the function of a housing.

As shown in FIG. 8, in the state where the window 220w is opened, the disk storage portion 220 having the function of a housing is pivoted. The projected area of the disk cartridge 200 in this state is larger than the projected area in the closed state. Therefore, in the opened state, the guide width, i.e., the distance between the guide walls 61a and 61b in the vicinity of the holder window 60s of the disk apparatus 105 is smaller than the width of the disk cartridge 200.

As a result, even if the disk cartridge 200 cannot be ejected to a predetermined position by the first and second open/close sliders 151 and 152 for some reason (for example, variance or malfunction of some elements) and needs to be removed in the direction of arrow 60B forcibly from outside by the operator, the first and second disk storage portions 221 and 222, which have been opened, are driven to be closed by the guide walls 61a and 61b provided in the vicinity of the holder window 60s. In consequence, the disk cartridge 200 can be removed with the first and second disk storage portions 221 and 222 being closed.

In this embodiment, the first and second open/close sliders 151 and 152 are structured to slide along the first and second slider guides 60a and 60b in the direction substantially perpendicular to the insertion/ejection direction of the disk cartridge 200 (direction of arrow 60A/arrow 60B).

Figure 11:
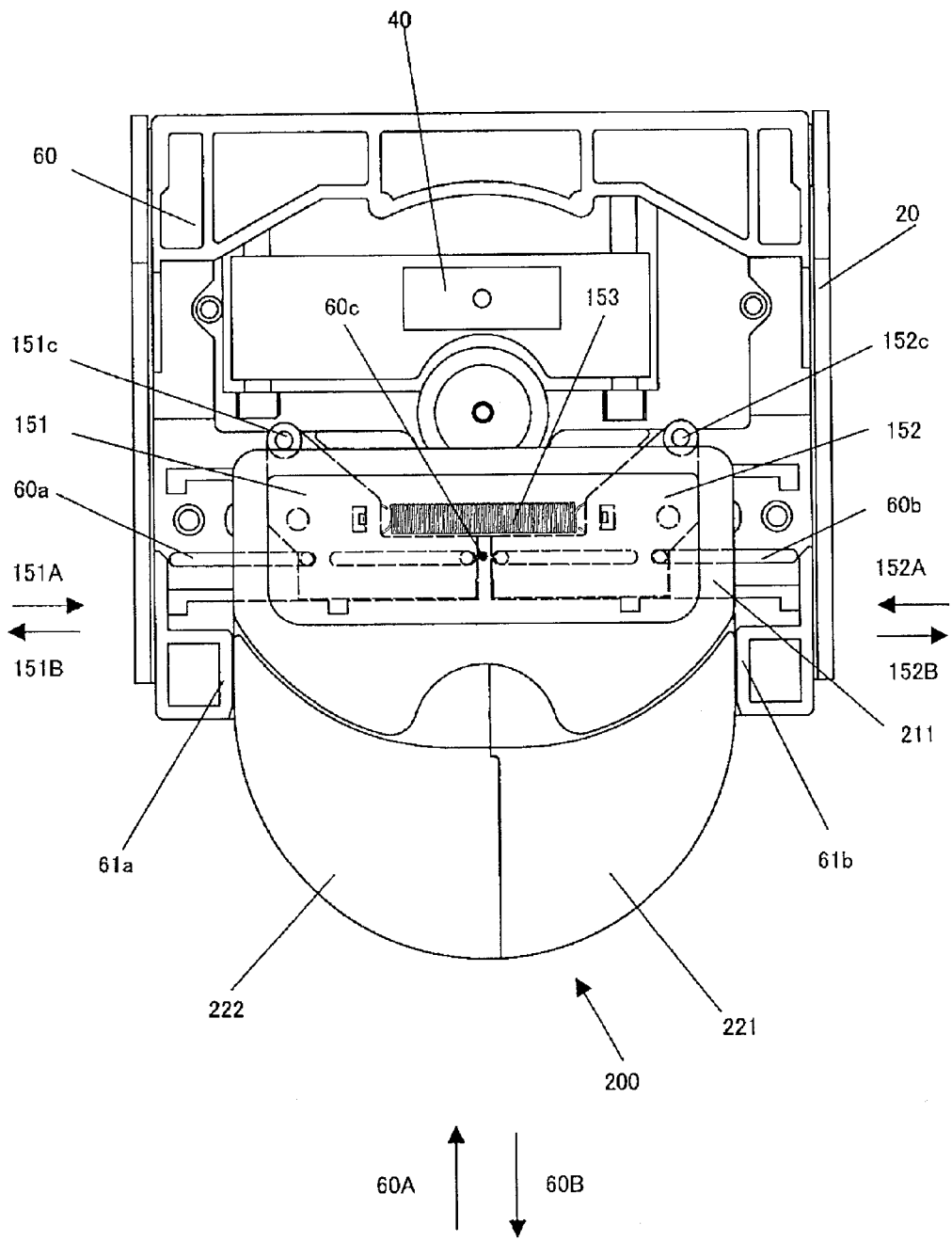
FIG. 11 is a plan view of a state in the first embodiment in which the disk cartridge is inserted with the leading end and the trailing end being inverted.

For this reason, as shown in FIG. 11, when the disk cartridge 200 is inserted into the disk apparatus 501 with the leading end and the trailing end being inverted, the first and second engageable portions 151c and 152c of the first and second open/close sliders 151 and 152 contact a surface of the disk cartridge 200 which are perpendicular to the insertion/ejection direction (direction of arrow 60A/arrow 60B). Therefore, the first and second engageable portions 151c and 152c receive a force only in the insertion direction of the disk cartridge 200.

However, the first and second open/close sliders 151 and 152 slide only in the direction generally perpendicular to the insertion direction (arrow 60A) by the first and second slider guides 60a and 60b. Therefore, even if an external force is applied to the first and second engageable portions 151c and 152c only in the insertion direction (arrow 60A), the first and second open/close sliders 151 and 152 do not slide in the directions of arrows 151B and 152B. In this manner, the disk cartridge 200 cannot be inserted to the inside of the disk apparatus 501 with the leading end and the trailing end being inverted.

As described above, the first and second open/close sliders 151 and 152 included in the cartridge open/close mechanism 150 slide in the direction generally perpendicular to the insertion/ejection direction of the disk cartridge 200 (direction of arrow 60A/arrow 60B). Owing to this structure, even if the operator sets the disk cartridge 200 with the leading end and the trailing end being inverted, the insertion of the disk cartridge 200 in such a wrong orientation can be prevented. In addition, because the first and second open/close sliders 151 and 152 also act as a wrong insertion prevention mechanism of the disk cartridge 200, the number of elements can be reduced.

In this embodiment, the first and second open/close sliders 151 and 152 are prevented from coming off from the first and second disk storage portions 221 and 222 by the structure in which the first and second engageable portions 151c and 152c of the first and second open/close sliders 151 and 152 contact the stop contact faces 221f and 222f of the first and second disk storage portions 221 and 222. Substantially the same effect is provided even where only one of the first and second engageable portions 151c and 152c contacts the corresponding stop contact face 221f or 222f.

In this embodiment, the disk cartridge 200 is positioned by the cartridge positioning pins 21 and 22 provided on the traverse base 20. The disk cartridge 200 may be positioned by pins provided on other elements. The slider positioning pins 25 and 26 are provided on the traverse base 20 in this embodiment, but may be provided on other elements.

In this embodiment, the disk cartridge 200 is prevented from being jumping when being ejected by the structure in which the first and second engageable portions 151c and 152c of the first and second open/close sliders 151 and 152 are engaged with the stop contact faces 221f and 222f of the first and second disk storage portions 221 and 222. Alternatively, another mechanism for preventing the jumping may be provided in the disk apparatus 501, or the jumping of the disk cartridge 200 may be prevented by a frictional member such as a rubber sheet.

In this embodiment, the disk cartridge 200 is prevented from interfering with the disk motor 30 and the optical head 40 during the insertion/ejection operation by the structure in which the cartridge holder 60 is slanted with respect to the traverse base 20. The interference with the disk motor 30 and the optical head 40 may be prevented by a known mechanism. For example, the cartridge holder 60 may be elevated generally parallel with the traverse base 20, or the traverse base 20 may be slanted with respect to the cartridge holder 60 during the insertion/ejection operation. Substantially the same effect is provided.

In this embodiment, the disk storage portion 220 is opened/closed by directly inserting/ejecting the disk cartridge 200 into the cartridge holder 60. Alternatively, for example, a loading system with an additional driving source may be used in which the disk cartridge 200 is placed on, or held by, a transportation member such as a tray or a holder and the transportation member is inserted into, or ejected from, the disk apparatus. Substantially the same effect is provided.

In this embodiment, the opening precision of the window 220w is improved by positioning the first and second open/close sliders 151 and 152 by the slider positioning pins 25 and 26 on the traverse base 20. Alternatively, the opening area of the window 220w, which is determined by the pair of link mechanisms formed of the first and second open/close sliders 151 and 152 and the first and second disk storage portions 221 and 222, may be set to be larger than is actually necessary in consideration of precision variance of various elements and engagement instability of the positioning pins, such that a sufficient opening area is obtained even with the least preferable set of values. In this case, the slider positioning pins 25 and 26 can be omitted.

In this manner, the disk apparatus according to the present invention is preferably suitable to the disk cartridge 200 for opening or closing the window 220w by the first and second disk storage portions 221 and 222 having both the function of a shutter and the function of a housing.

Specifically, the first and second disk storage portions 221 and 222 can be opened or closed by the structure in which the first and second open/close sliders 151 and 152 respectively engaged with the notch 221d of the first disk storage portion 221 and the notch 222d of the second disk storage portion 222 are located symmetrically with respect to the insertion/ejection direction of the disk cartridge 200 (direction of arrow 60A/arrow 60B) and pivoted in synchronization with the insertion/ejection of the disk cartridge 200. With this structure, the disk cartridge 200 is guaranteed to move linearly and thus a significantly stable insertion/ejection operation is realized.

During the ejection operation of the disk cartridge 200, the first and second disk storage portions 221 and 222 are respectively supported by the first and second open/close sliders 151 and 152. Therefore, even against vibration, impact or other external disturbances, a stable insertion/ejection operation is realized.

The loading force of the loading spring for loading the first and second open/close sliders 151 and 152 in the direction of closing the first and second disk storage portions 221 and 222 is utilized. Owing to this, during the insertion operation of the disk cartridge 200 by the operator, the pivoting of the first and second open/close sliders 151 and 152 is supplied with an appropriate operation load, so that the first and second open/close sliders 151 and 152 can be engaged with the first and second disk storage portions 221 and 222 with certainty and so the disk storage portion 220 is opened. During the ejection operation of the disk cartridge 200, the disk cartridge 200 can be automatically ejected by the loading force of the loading spring, and the first and second disk storage portions 221 and 222 can also be closed with certainty.

Accordingly, the operability of the insertion/ejection of the disk cartridge 200 (sense of operability in the man-machine interface) can be uniquely controlled by the loading force of the loading spring, and a driving source and a driving mechanism which would be otherwise necessary for inserting or ejecting the disk cartridge 200 can be omitted. This significantly reduces the number of elements of the disk apparatus 501 and so reduces the weight and cost of the disk apparatus 501.

Because the unlock portions 62a and 62b, are provided on a part of the guide walls 61a and 61b, the positional precision of the unlock portions 62a and 62b is improved. Therefore, the first and second lock members 231 and 232 can be pressed with certainty, and the unlocking operation of the first and second lock members 231 and 232 during the insertion/ejection operation can be performed at an optimum timing with certainty.

The cartridge open/close mechanism 150 is provided on the holder window 60s side of the disk apparatus 501. This avoids the interference of the first and second open/close sliders 151 and 152 with the optical head 40 and thus improves the degree of designing flexibility of the optical head 40, and also avoids the overlapping of the optical head 40 and the first and second open/close sliders 151 and 152 and thus reduces the thickness of the disk apparatus 501.

The cartridge open/close mechanism 150 including the first and second open/close sliders 151 and 152 and the slider loading spring 153 is located two-dimensionally below the disk cartridge 200. Owing to this, the space other than the projected area of the disk cartridge 200 in the direction of the rotation axis of the disk 10 can be used for locating other elements. This can improve the degree of designing flexibility, for example, the strength of the cartridge holder 60 may be improved or an additional mechanism may be located.

Embodiment 2

Hereinafter, a second embodiment of a disk apparatus according to the present invention will be described in detail with reference to the drawings.

Figure 12:
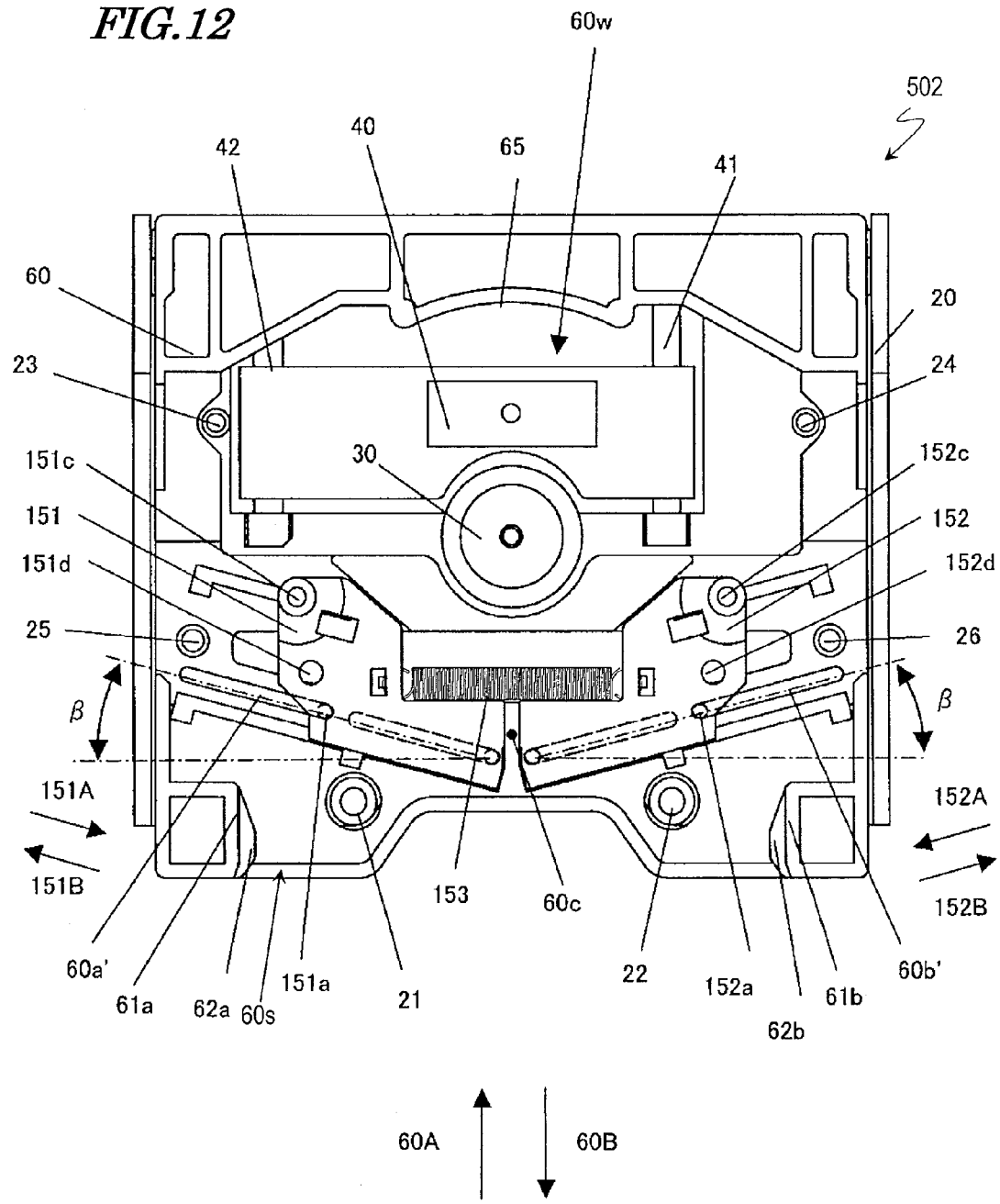
FIG. 12 is a plan view showing a structure of a disk apparatus according to a second embodiment.

FIG. 12 is a plan view of a disk apparatus 502 according to the second embodiment of the present invention, which allows the disk cartridge 200 to be mounted thereon. As shown in FIG. 12, in the disk apparatus 502, slider guides 60$a$' and 60$b$' for guiding the first and second open/close sliders 151 and 152 are respectively extended in directions which are neither parallel nor perpendicular to the insertion/ejection direction of the disk cartridge 200. Namely, the disk apparatus 502 is different from the disk apparatus in Embodiment 1 in the direction in which the first and second slider guides are extended, and are the same as the disk apparatus in Embodiment 1 in the other points. For the disk apparatus 502, identical elements to those of Embodiment 1 bear identical reference numerals thereto and the descriptions thereof will be omitted in order to avoid repetition.

As shown in FIG. 12, the first and second slider guides 60$a$' and 60$b$' extend in directions slanting by angle $\beta$ with respect to the direction perpendicular to the insertion/ejection direction (direction of arrow 60A/arrow 60B). Therefore, first and second open/close sliders 151 and 152, which are in engagement with the first and second slider guides 60$a$' and 60$b$', also slide in directions slanting by angle $\beta$ with respect to the direction perpendicular to the insertion/ejection direction (direction of arrow 60A/arrow 60B). As a result, during the insertion operation of the disk cartridge 200, the first and second engageable portions 151$c$ and 152$c$ of the first and second open/close sliders 151 and 152 start to be engaged with the disk cartridge 200 at positions closer to the holder window 60$s$ than the positions at which the first and second engageable portions are located 151$c$ and 152$c$ are located in the state where the disk cartridge 200 is mounted. That is, the positions of the first and second engageable portions 151$c$ and 152$c$ in the state where the first and second disk storage portions 221 and 222 are open are closer to the holder window 60$s$ than the positions of the first and second engageable portions 151$c$ and 152$c$ in the state where the first and second disk storage portions 221 and 222 are closed.

First, with reference to FIG. 13, a force acting on the first and second engageable portions 151$c$ and 152$c$ when the disk cartridge 200 is inserted into the disk apparatus in Embodiment 2 will be described.

As described above, the first and second link mechanisms formed of the first and second open/close sliders 151 and 152 and the first and second disk storage portions 221 and 222 are structured symmetrically with respect to the line segment L. Therefore, as shown in FIG. 13, where the force for inserting the disk cartridge 200 in the direction of arrow 60A is P, a force of P/2 acts on each of the first and second engageable portions 151$c$ and 152$c$ in the direction same as the insertion direction.

Figure 13:
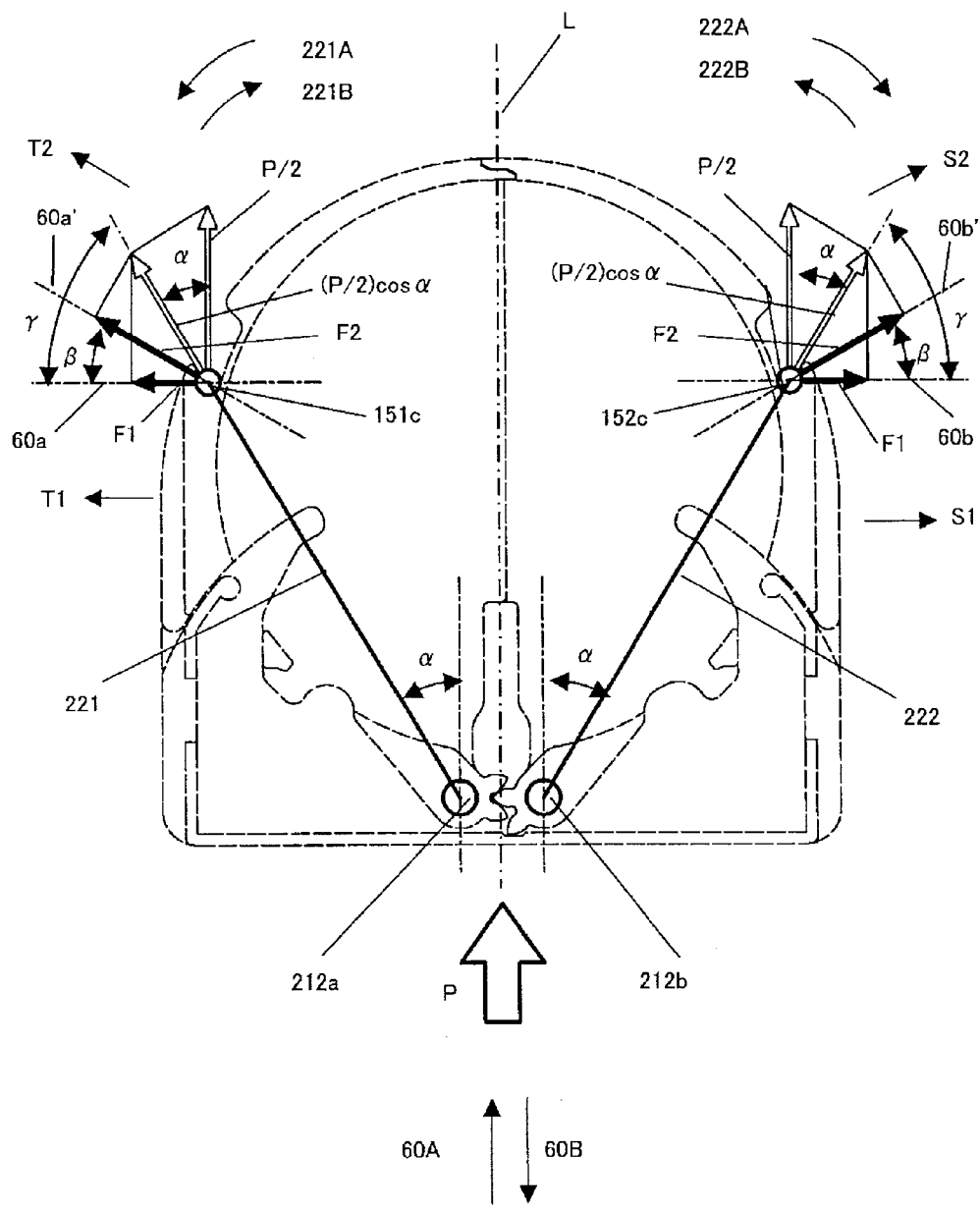
FIG. 13 shows a direction of a force acting on engageable portions of first and second open/close sliders when the disk cartridge is inserted.

In the state where the first and second engageable portions 151$c$ and 152$c$ are in engagement with the notches 221$d$ and 222$d$ as shown in FIG. 13, the lock members 231 and 232 have been completely unlocked and the first and second disk storage portions 221 and 222 are pivotable around the rotation support shafts 212$a$ and 212$b$. Therefore, when the force of P/2 acts on each of the first and second engageable portions 151$c$ and 152$c$, the first and second disk storage portions 221 and 222 receive a resistance force from the first and second engageable portions 151$c$ and 152$c$, and the resistance force generates a moment around the rotation support shafts 212$a$ and 212$b$.

As a result, the first and second engageable portions 151$c$ and 152$c$ receive a force in a tangential direction of the rotation of the first and second disk storage portions 221 and 222 around the rotation support shafts 212$a$ and 212$b$. The resultant force, including the force in the tangential direction and the force of P/2 acting in the insertion direction, acts in a direction having angle $\alpha$ with respect to the insertion/ejection direction with a magnitude of (P/2)cos $\alpha$. Out of the resultant force, a force for sliding the first and second open/close sliders 151 and 152 is determined by the angle made by the first and second slider guides 60$a$ and 60$b$ (60$a$' and 60$b$') and the first and second disk storage portions 221 and 222.

In Embodiment 1, angle $\gamma$ made by the first and second slider guides 60$a$ and 60$b$ and the first and second disk storage portions 221 and 222 is $\gamma = (90° - \alpha)$ because first and second slider guides 60$a$ and 60$b$ are perpendicular to the insertion/ejection direction. Accordingly, force F1 acting for sliding the first and second open/close sliders 151 and 152 is F1=(P/2) cos $\alpha \cdot$cos $\gamma$.

In Embodiment 2, the first and second slider guides 60$a$' and 60$b$' are slanted by angle $\beta$ with respect to the direction perpendicular to the insertion/ejection direction. Therefore, the angle made by the first and second slider guides 60$a$' and 60$b$' and the first and second disk storage portions 221 and 222 is ($\gamma-\beta$). Accordingly, as shown in FIG. 13, force F2 acting for sliding the first and second open/close sliders 151 and 152 is F2=(P/2)cos $\alpha \cdot$cos($\gamma-\beta$).

As shown in FIG. 13, in the range of 0°<$\beta$<$\gamma$, force F2 is larger than force F1 in order to fulfill the relationship of cos $\gamma$<cos($\gamma-\beta$). In Embodiment 2 where the first and second slider guides 60$a$' and 60$b$' are slanted by angle $\beta$ with respect to the direction perpendicular to the insertion/ejection direction, it is easier to slide the first and second open/close sliders 151 and 152 than in Embodiment 1 when the same disk cartridge 200 is inserted. In other words, where the load on the sliding operation is the same in Embodiment 1 and Embodiment 2, the disk cartridge 200 can be inserted by a smaller force in Embodiment 2, which improves the operability.

Figure 16:
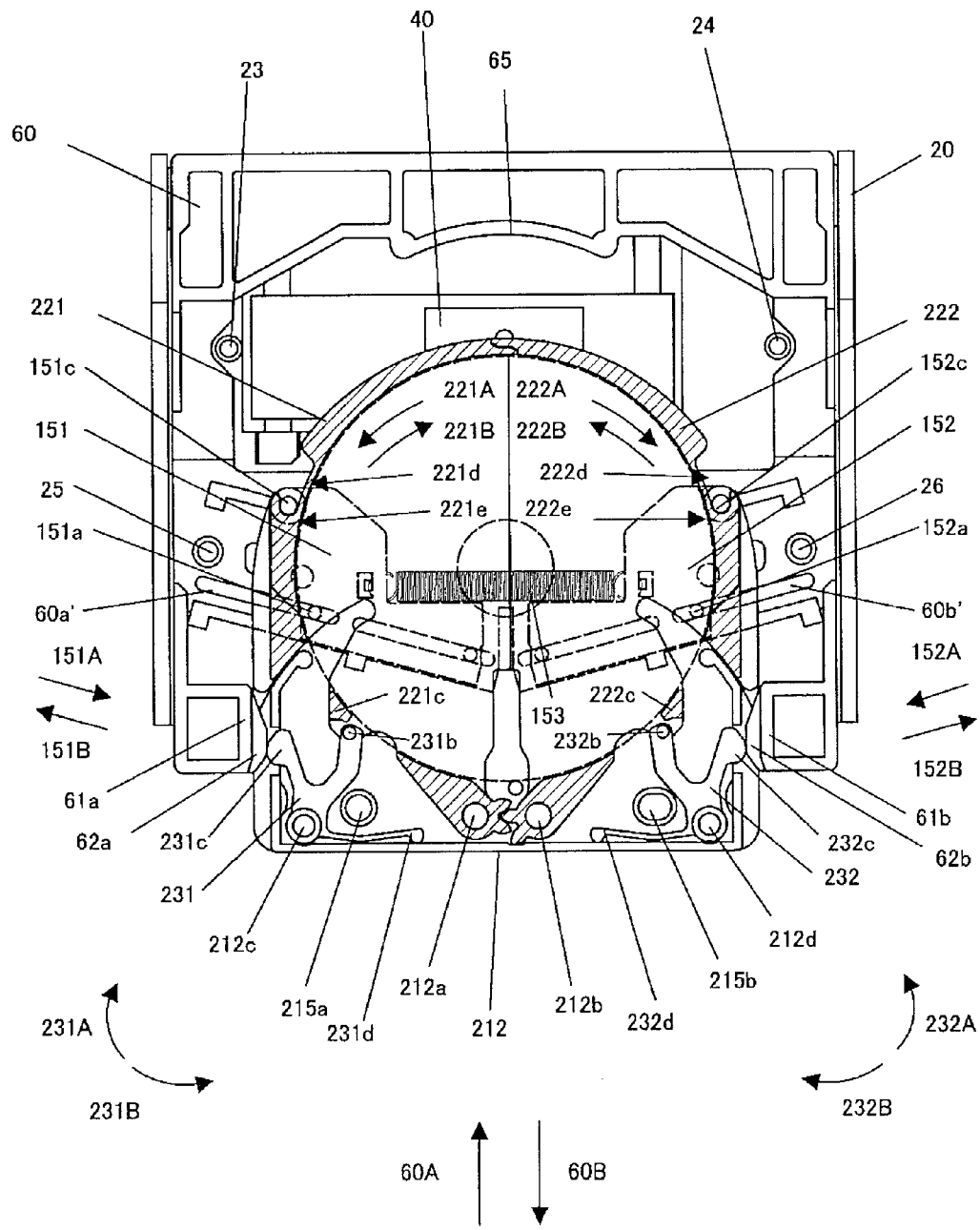
FIG. 16 is a plan view of one state during the opening operation or the closing operation of the cartridge open/close mechanism in the second embodiment.

The relationship of cos $\gamma$<cos($\gamma-\beta$) is fulfilled when angle $\beta$ fulfills the relationship of 0°<$\beta$<2$\gamma$. For example, where FIG. 6 showing the starting position of the operation of opening the cartridge open/close mechanism 150 in Embodiment 1, and FIG. 16 showing the starting position of the operation of opening the cartridge open/close mechanism 150 in Embodiment 2, are compared, $\alpha$=30° and $\beta$=15°. When each value is substituted to the above relationship, F1=0.217×P and F2=0.306×P. Accordingly, F1 and F2 fulfill the relationship of F2=1.4×F1. Where the load on the sliding operation is the same in Embodiment 1 and Embodiment 2, the force required to insert the disk cartridge 200 into the disk apparatus 502 in Embodiment 2 is 1/1.4 times the force required to insert the disk cartridge 200 into the disk apparatus 501 in Embodiment 1. That is, the force for inserting the disk cartridge 200 is smaller in Embodiment 2 than in Embodiment 1. As is appreciated from this, by slanting the first and second slider guides as realized by 60a' and 60b', the sliding operation of the first and second open/close sliders 151 and 152 is enhanced with an improved operability for the operator.

Now, an operation of the cartridge open/close mechanism 150 in the disk apparatus 502 will be described. As described above, Embodiment 2 is different from Embodiment 1 in the direction of the first and second slider guides. The operation by which the first and second open/close sliders 151 and 152 slide along the first and second slider guides 60a' and 60b' and open or close the first and second disk storage portions 221 and 222 is basically the same as in Embodiment 1.

First, with reference to FIG. 14 through FIG. 18, an opening of the cartridge open/close mechanism 150 for inserting the disk cartridge 200 into the cartridge holder 60 of the disk apparatus 502 will be described. The states of the disk apparatus 502 shown in FIG. 14 through FIG. 18 correspond to the states of the disk apparatus 501 shown in FIG. 4 through FIG. 8 in Embodiment 1.

Figure 14:
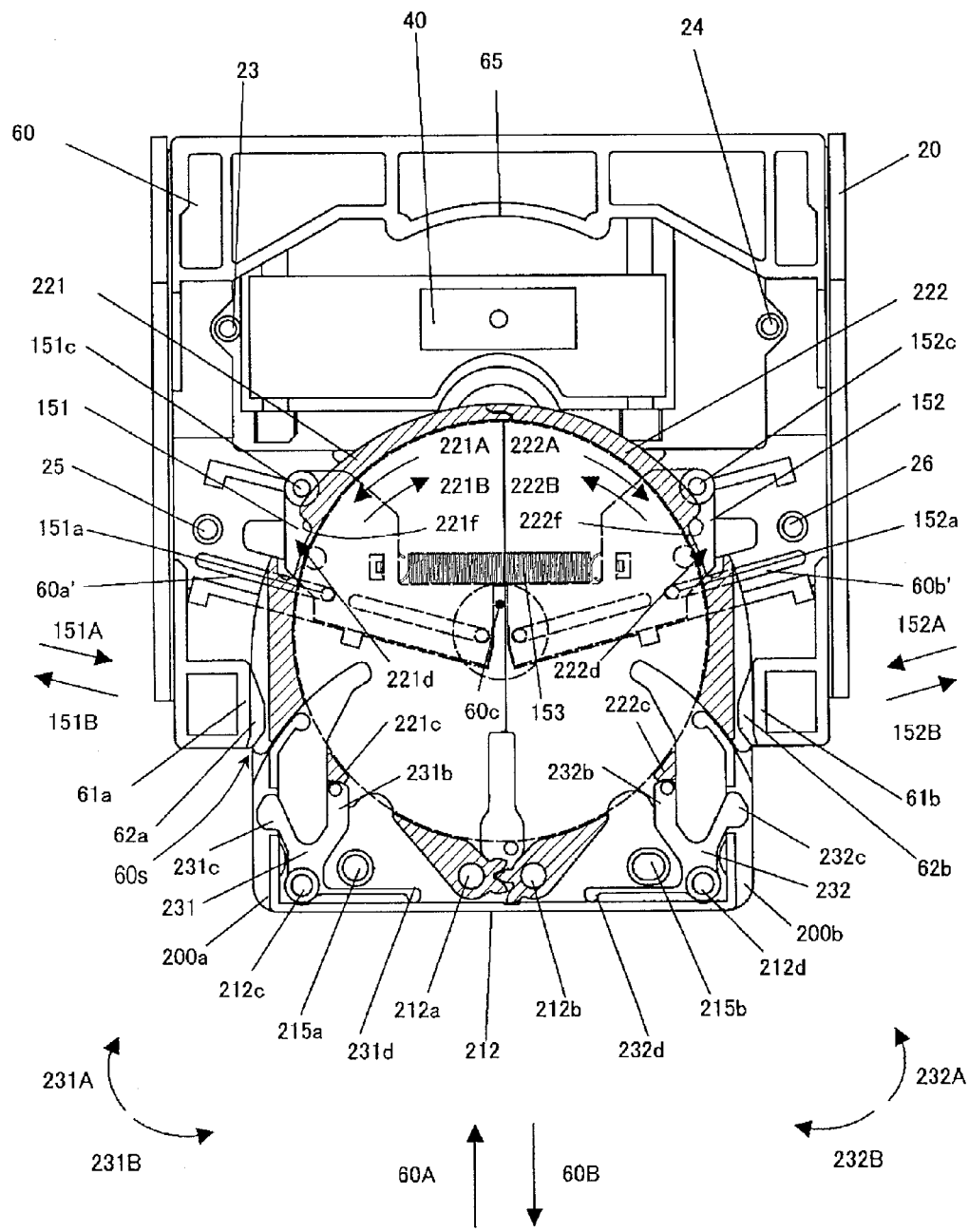
FIG. 14 is a plan view of one state during an opening operation or a closing operation of a cartridge open/close mechanism in the second embodiment.

As shown in FIG. 14, the operator inserts the disk cartridge 200 from the holder window 60s to the inside of the cartridge holder 60 as represented with arrow 60A. The disk cartridge 200 is inserted into the cartridge holder 60 while being guided by the guide walls 61a and 61b in terms of a width direction thereof which is perpendicular to the insertion direction (arrow 60A).

The first and second open/close sliders 151 and 152 are in contact with the stopper 60c and are kept at the predetermined wait positions. At this point, the distance between the first and second engageable portions 151c and 152c of the first and second open/close sliders 151 and 152 is smaller than the distance between the guide walls 61a and 61b. Therefore, as the disk cartridge 200 is inserted deeper, the first and second engageable portions 151c and 152c contact outer profile surfaces of the first and second disk storage portions 221 and 222.

At this point, the unlock portions 62a and 62b provided on the guide walls 61a and 62a pass the unlock slits 200a and 200b of the disk cartridge 200.

Figure 15:
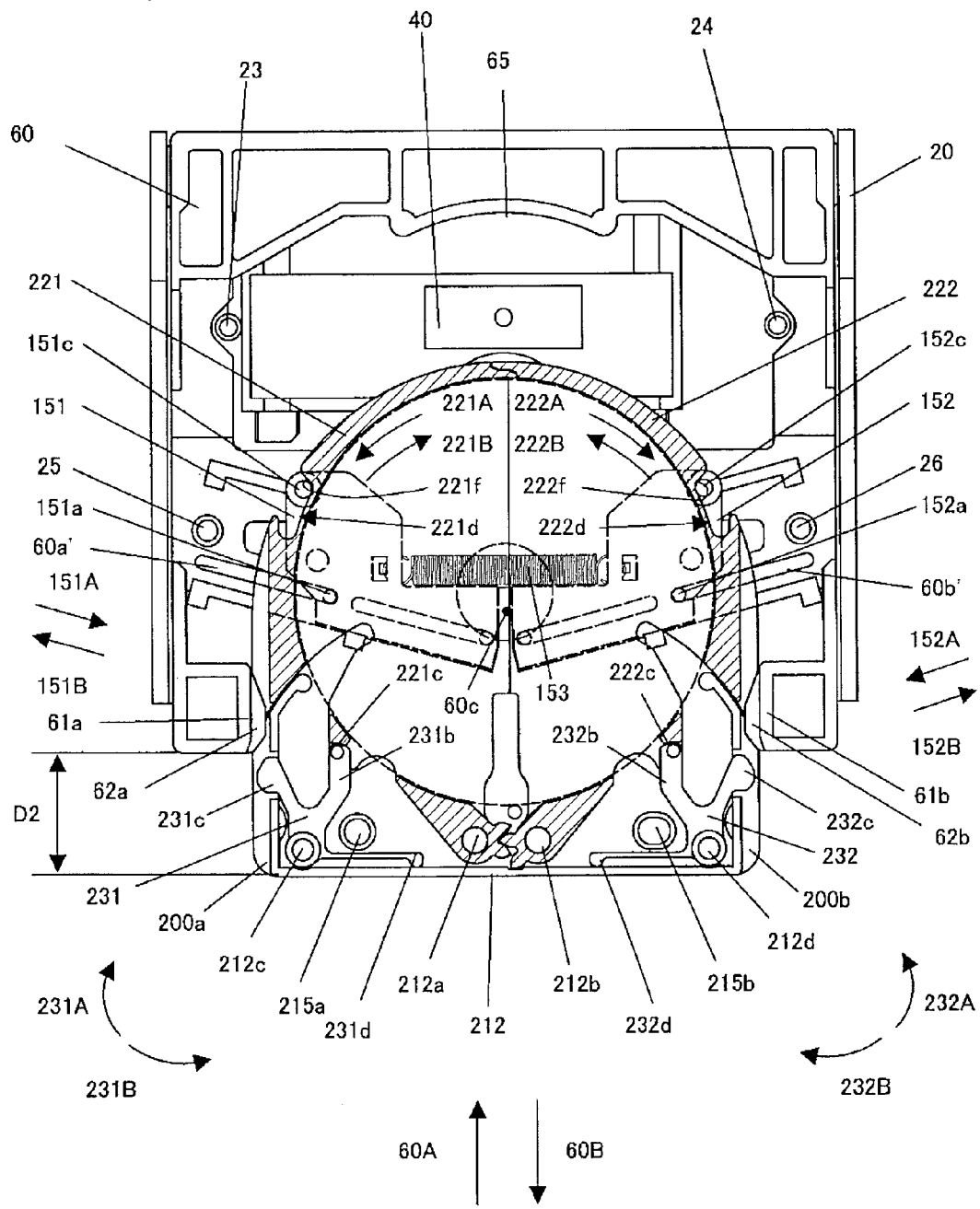
FIG. 15 is a plan view of one state during the opening operation or the closing operation of the cartridge open/close mechanism in the second embodiment.

When the disk cartridge 200 is inserted deeper in the direction of arrow 60A from the state shown in FIG. 14, as shown in FIG. 15, the first open/close slider 151 slides in the direction of arrow 151B along the first slider guide 60a' against the loading force of the slider loading spring 153 because of the contact of the first engageable portion 151c and the outer profile surface of the first disk storage portion 221. Then, the first open/close slider 151 again slides in the direction of arrow 151A by the loading force of the slider loading spring 153, and the first engageable portion 151c is moved to a position where the first engageable portion 151c contacts the stop contact face 221f of the notch 221d of the first disk storage portion 221.

Similarly, the second open/close slider 152 slides in the direction of arrow 152B along the second slider guide 60b' against the loading force of the slider loading spring 153 because of the contact of the second engageable portion 152c and the outer profile surface of the second disk storage portion 222. Then, the second open/close slider 152 again slides in the direction of arrow 152A by the loading force of the slider loading spring 153, and the second engageable portion 152c is moved to a position where the engageable portion 152c contacts the stop contact face 222f of the notch 222d of the second disk storage portion 222.

When the disk cartridge 200 is inserted further deeper in the direction of arrow 60A from the state shown in FIG. 15, as shown in FIG. 16, the first engageable portion 151c of the first open/close slider 151 moves in contact with an inner wall of the notch 221d of the first disk storage portion 221 by the loading force of the slider loading spring 153, and reaches and is engaged with the semi-arc-shaped engageable portion 221e of the notch 221d. Thus, the first link mechanism is formed of the first open/close slider 151 and the first disk storage portion 221.

Similarly, the second engageable portion 152c of the second open/close slider 152 moves in contact with an inner wall of the notch 222d of the second disk storage portion 222 by the loading force of the slider loading spring 153, and reaches and is engaged with the semi-arc-shaped engageable portion 222e of the notch 222d. Thus, the second link mechanism is formed of the first open/close slider 152 and the first disk storage portion 222.

At this point, the unlock portions 62a and 62b press the operation portions 231c and 232c of the first and second lock members 231 and 232 at the same time to rotate the first and second lock members 231 and 232 in the directions of arrows 231A and 232A respectively while deforming the elastic portions 231d and 232d. Thus, the stop levers 231b and 232b of the first and second lock members 231 and 232 are separated from the stop portion 221c and 222c of the first and second disk storage portions 221 and 222, which releases the first and second disk storage portions 221 and 222 from the locked state. As a result, the first and second disk storage portions 221 and 222 are made rotatable in the directions of arrows 221A and 222A respectively.

Figure 17:
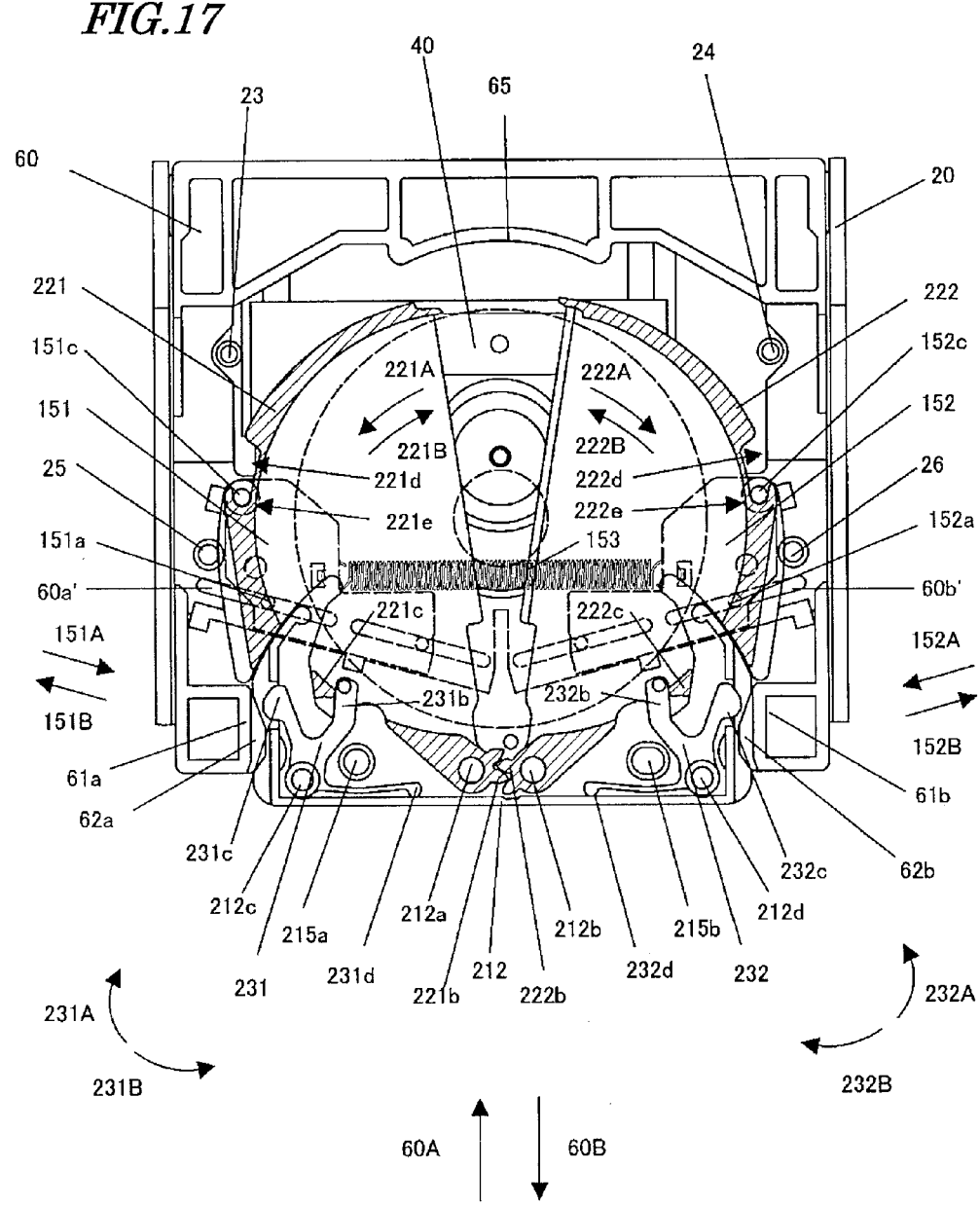
FIG. 17 is a plan view of one state during the opening operation or the closing operation of the cartridge open/close mechanism in the second embodiment.

When the disk cartridge 200 is inserted further deeper in the direction of arrow 60A from the state shown in FIG. 16, as shown in FIG. 17, the first and second open/close sliders 151 and 152 start sliding in the directions of arrows 151B and 152B along the first and second slider guides 60a' and 60b' respectively by the first link mechanism formed of the first open/close slider 151 and the first disk storage portion 221 and the second link mechanism formed of the second open/close slider 152 and the second disk storage portion 222. In association with this, the first and second disk storage portions 221 and 222 start rotating in the directions of arrows 221A and 222A around the rotation support shafts 212a and 212b respectively.

At this point, the first and second disk storage portions 221 and 222 are associated to be rotated in the opposite directions to each other by the association portions 221b and 222b, which are engaged with each other. Therefore, the first and second open/close sliders 151 and 152 are associated to slide in the opposite directions to each other via the first and second disk storage portions 221 and 222.

As described above in Embodiment 1, while being inserted in the direction of arrow 60A, the disk cartridge 200 is guaranteed to move linearly by the first and second open/close sliders 151 and 152 structured symmetrically, and also guided in terms of the height direction. As a result, the disk storage portion 220 can be opened stably.

Figure 18:
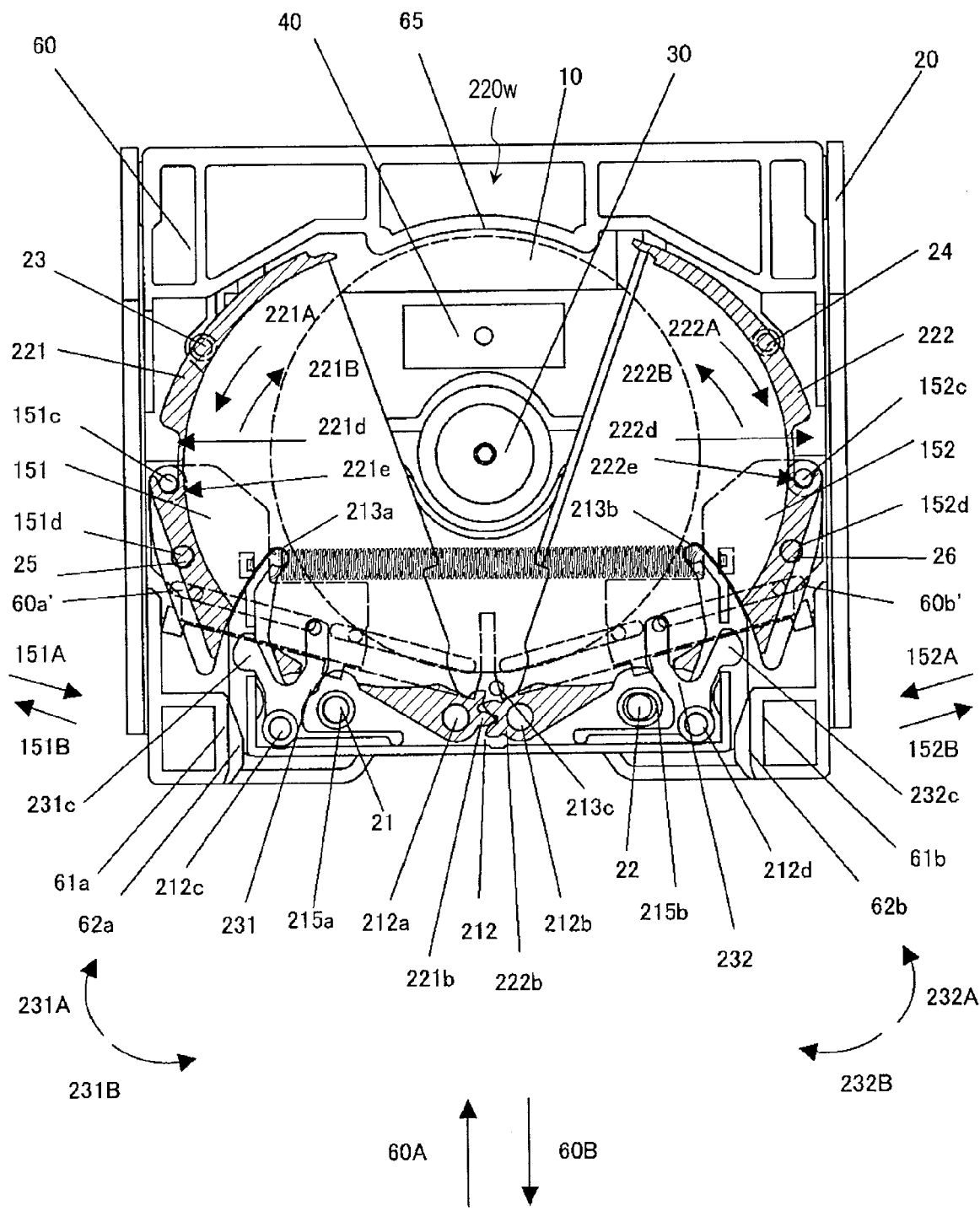
FIG. 18 is a plan view of one state during the opening operation or the closing operation of the cartridge open/close mechanism in the second embodiment.

When the disk cartridge 200 is inserted further deeper in the direction of arrow 60A from the state shown in FIG. 17, as shown in FIG. 18, the disk cartridge 200 is inserted to the inside of the cartridge holder 60 and the first and second disk storage portions 221 and 222 are pivoted to a predetermined angle. As a result, the window 220w is formed in the disk cartridge 200.

At this point, the positioning member 65 provided in the cartridge holder 60 enters the window 220w. The position of the disk 10 is restricted by the position restriction portions 213a, 213b and 213c included in the bottom support base member 212 and the positioning member 65, and thus the center of the disk 10 when the window 220w is opened is positioned.

When the operator pivots the cartridge holder 60 in the direction of arrow 80B from the state of being slanted by predetermined angle θ with respect to the traverse base 20 as shown in FIG. 3A to the state where writing/reading is possible as shown in FIG. 3B, the cartridge positioning pins 21 and 22 on the traverse base 20 are engaged with the positioning holes 215a and 215b of the bottom support base member 212. Thus, the bottom support base member 212 is positioned with respect to the traverse base 20. At the same time, the rotation support shafts 212a and 212b, which are pivoting axes for the first and second disk storage portions 212 and 222, are positioned with respect to the traverse base 20.

In addition, the slider positioning pins 25 and 26 on the traverse base 20 are engaged with the positioning holes 151d and 152d of the first and second open/close sliders 151 and 152 to position the first and second open/close sliders 151 and 152. Owing to this, the first and second disk storage portions 221 and 222 can be opened with higher precision and the window 220w of a predetermined size can be formed with certainty.

At this point, the disk 10 is clamped by the disk placing surface 30a of the disk motor 30 and the clamper 50 (not shown in FIG. 18) and is made rotatable. The position restriction portions 213a, 213b and 213c of the bottom support base member 212 are also positioned with respect to the traverse base 20. Therefore, the position restriction portions 213a, 213b and 213c are guaranteed to have a necessary clearance with respect to the disk 10.

As shown in FIG. 18, in the state where writing data on, or reading data from, the disk 10 is possible, the unlock portions 62a and 62b are separated from the operation portions 231c and 232c of the first and second lock members 231 and 232. Therefore, the elastic portions 231d and 232d of the first and second lock members 231 and 232 are not elastically deformed. Owing to this, the elastic portions 231d and 232d can be prevented from creeping even where the first and second lock members 231 and 232 are each integrally formed of a resin.

As described above, by inserting the disk cartridge 200 in the direction of arrow 60A and changing the state shown in FIG. 14 to the state shown in FIG. 18, the window 220w of the disk cartridge 200 is completely opened. Thus, the opening operation of the cartridge open/close mechanism 150 is completed.

Next, a closing operation of the cartridge open/close mechanism 150 for ejecting the disk cartridge 200 from the cartridge holder 60 will be described.

The closing operation of the cartridge open/close mechanism 150 is performed oppositely to the opening operation of the cartridge open/close mechanism 150 described above. That is, the operation starts with the state shown in FIG. 18, which is changed to the state shown in FIG. 14 by the operation of ejecting the disk cartridge 200 in the direction of arrow 60B. In the state shown in FIG. 14, the disk storage portion 220 is completely closed. Then, the disk cartridge 200 is ejected out of the disk apparatus 502. With reference to FIG. 18 through FIG. 14, the closing operation of the cartridge open/close mechanism 150 will be described.

As shown in FIG. 18, in the state where the disk cartridge 200 is property mounted on the disk apparatus 502, the operator pivots the cartridge holder 60 in the direction of arrow 80A from the state shown in FIG. 3B to the state shown in FIG. 3A where the disk cartridge 200 can be inserted or ejected. Thus, the cartridge positioning pins 21 and 22, which have been in engagement with the positioning holes 215a and 215b of the bottom support base member 212, are disengaged therefrom, and the slider positioning pins 25 and 26, which have been in engagement with the positioning holes 151d and 152d of the first and second open/close sliders 151 and 152, are disengaged therefrom. As a result, the slidable elements included in the first and second link mechanisms (the first and second open/close sliders 151 and 152 and the rotation support shafts 212a and 212b for the first and second disk storage portions 221 and 222) are released from the restricted state. The disk cartridge 200 is made movable in the directions of arrows 60A and 60B along the guide walls 61a and 61b of the cartridge holder 60. The first and second open/close sliders 151 and 152 start sliding in the directions of arrows 151A and 152A respectively by the loading force of the slider loading spring 153.

Opposite to the opening operation, as the first and second open/close sliders 151 and 152 move in the directions of arrows 151A and 152A respectively, the first and second disk storage portions 221 and 222 are pivoted in the directions of arrows 221B and 222B respectively by the link mechanisms with the first and second open/close sliders 151 and 152. Thus, the operation of closing the disk storage portion 220 is started.

When the first and second open/close sliders 151 and 152 slide in the directions of arrows 151A and 152A by the loading force of the slider loading spring 153 from the state shown in FIG. 18, as shown in FIG. 17, the disk cartridge 200 closes the disk storage portion 220 by the action of the link mechanisms formed of the first and second open/close sliders 151 and 152 and the first and second disk storage portions 221 and 222, while being guided by the guide walls 61a and 61b to be ejected in the direction of arrow 60B.

At this point, like in the opening operation described above, the first and second disk storage portions 221 and 222 are associated to be rotated in opposite directions to each other by the association portions 221b and 222b. The first and second open/close sliders 151 and 152 are structured symmetrically with respect to the ejection direction of the disk cartridge 200 (arrow 60B). For these reasons, the disk cartridge 200 is guaranteed to move linearly when being ejected.

Like in the opening operation described above, the elements in the vicinity of the first and second engageable portions 151c and 152c of the first and second open/close sliders 151 and 152 contact and thus support the bottom surfaces of the first and second disk storage portions 221 and 222. Thus, such elements guide the first and second disk storage portions 221 and 222 in terms of the height direction during the operation of ejecting the disk cartridge 200 in the direction of arrow 60B.

When the disk cartridge 200 is further ejected in the direction of arrow 60B by the loading force of the slider loading spring 153 from the state shown in FIG. 17, the first and second open/close sliders 151 and 152 keep sliding in the directions of arrows 151A and 152A respectively. Owing to this, the first and second disk storage portions 221 and 222 are pivoted in the directions of arrows 221B and 222B respectively. As a result, as shown in FIG. 16, the window 220w is completely closed by the disk storage portion 220.

At this point, the unlock portions 62a and 62b contact the operation portions 231c and 232c of the first and second lock members 231 and 232 to pivot the first and second lock members 231 and 232 in the directions of arrows 231A and 232A respectively. Therefore, the stop portions 221c and 222c of the first and second disk storage portions 221 and 222 are separated from the stop levers 231b and 232b of the first and second lock members 231 and 232. As a result, the first and second disk storage portions 221 and 222 are not locked.

When the first and second open/close sliders 151 and 152 keep sliding in the directions of arrows 151A and 152A respectively by the loading force of the slider loading spring 153 from the state shown in FIG. 16, the first and second engageable portions 151c and 152c of the first and second open/close sliders 151 and 152 ejection the disk cartridge 200 in the direction of arrow 60B while being in contact with the inner walls of the notches 221d and 222d of the first and second disk storage portions 221 and 222.

As shown in FIG. 15, the first and second engageable portions 151c and 152c contact the stop contact faces 221f and 222f of the notches 221d and 222d. In this manner, the operation for ejecting the disk cartridge 200 in the direction of arrow 60B by the loading force of the slider loading spring 153 is completed.

The contact of the first and second engageable portions 151c and 152c with the stop contact faces 221f and 222f prevents the disk cartridge 200 from jumping in the direction of arrow 60B by the loading force of the slider loading spring 153 and thus from coming off from the disk apparatus 502.

At this point, the operation portions 231c and 232c of the first and second lock members 231 and 232 are separated from the unlock portions 62a and 62b. Therefore, the first and second lock members 231 and 232 are pivoted in the directions of arrows 231B and 232B by the elastic force of the elastic portions 231d and 232d respectively. As a result, the stop portions 221c and 222c of the first and second disk storage portions 221 and 222 are engaged with the stop levers 231b and 232b of the first and second lock members 231 and 232. This locks the first and second disk storage portions 221 and 222 so as not to be rotated in the directions of 221A and 222B.

In FIG. 15, ejection distance D2 of the disk cartridge 200 is larger than ejection distance D1 in FIG. 5 in Embodiment 1 (D2>D1). The reason is that while the first and second engageable portions 151c and 152c of the first and second open/close sliders 151 and 152 are located at the same positions as in Embodiment 1 in the state where the disk cartridge 200 is mounted, whereas the first and second slider guides 60a' and 60b' are slanted by angle β. Therefore, in the state where the first and second disk storage portions 221 and 222 are closed, the first and second engageable portions 151c and 152c are positioned closer to the cartridge window 60s (on the side from which the disk cartridge 200 is inserted) and so the ejection distance of the disk cartridge 200 is increased. Accordingly, in this embodiment, the operability of removal of the disk cartridge 200 from the disk apparatus 502 is improved.

When the operator pulls the disk cartridge 200 in the direction of arrow 60B from the state shown in FIG. 15, the first and second open/close sliders 151 and 152 slide in the directions of arrows 151B and 152B against the loading force of the slider loading spring 153. Thus, the first and second engageable portions 151c and 152c of the first and second open/close sliders 151 and 152 move while sliding on the stop contact faces 221f and 222f of the first and second disk storage portions 221 and 222.

Then, as shown in FIG. 14, the first and second engageable portions 151c and 152c contact the outer profile surfaces of the first and second disk storage portions 221 and 222 and are disengaged from the stop contact faces 221f and 222f of the first and second disk storage portions 221 and 222. Thus, the disk cartridge 200 is released from the held state. This allows the disk cartridge 200 to be removed out of the cartridge holder 60.

Then, when the operator removes the disk cartridge 200 in the direction of arrow 60B, the disk cartridge 200 is completely ejected from the cartridge holder 60. In this manner, the closing operation of the cartridge open/close mechanism 150 is completed.

In this embodiment, the first and second slider guides 60a' and 60b' are slanted by angle β with respect to the direction perpendicular to the insertion/ejection direction of the disk cartridge 200. Therefore, when the disk cartridge 200 is inserted with the leading end and the trailing end being inverted and the first and second engageable portions 151c and 152c of the first and second open/close sliders 151 and 152 contact the flat surface of the disk cartridge 200, the first and second open/close sliders 151 and 152 slide along the first and second slider guides 60a' and 60b'. As a result, an external force in the insertion direction (direction of arrow 60A) is dispersed, and the force for sliding the first and second open/close sliders 151 and 152 in the directions of arrows 151B and 152B is made smaller than the force in the insertion direction. This makes it difficult to insert the disk cartridge 200 in the opposite orientation to the inside of the disk apparatus 502. Thus, the insertion of the disk cartridge 200 in such a wrong orientation can be prevented. In addition, because the first and second open/close sliders 151 and 152 also act as a wrong insertion prevention mechanism of the disk cartridge 200, the number of elements can be reduced. In order to inhibit the first and second open/close sliders 151 and 152 from sliding, angle β is preferably as small as possible, which can prevent the insertion of the disk cartridge 200 in the wrong orientation with certainty.

In this manner, the disk apparatus according to the present invention is preferably suitable to the disk cartridge 200 for opening or closing the window 220w by the first and second disk storage portions 221 and 222 having both the function of a shutter and the function of a housing.

Specifically, the first and second disk storage portions 221 and 222 can be opened or closed by the structure in which the first and second open/close sliders 151 and 152 respectively engaged with the notch 221d of the first disk storage portion 221 and the notch 222d of the second disk storage portion 222 are located symmetrically with respect to the insertion/ejection direction of the disk cartridge 200 (direction of arrow 60A/arrow 60B) and pivoted in synchronization with the insertion/ejection of the disk cartridge 200. With this structure, the disk cartridge 200 is guaranteed to move linearly and thus a significantly stable insertion/ejection operation is realized.

Owing to the structure in which the first and second slider guides 60a' and 60b' are slanted with respect to the insertion/ejection direction of the disk cartridge 200, the load on the disk cartridge 200 when being inserted can be decreased, and the ejection distance of the disk cartridge 200 can be increased. This can further improve the insertion/ejection operability of the disk cartridge 200.

As described above in Embodiment 1 and Embodiment 2, in a disk apparatus according to the present invention, the distance between the first and second engageable portions of the first and second open/close sliders is smaller than the distance between the pair of guide walls. Therefore, the first and second engageable portions contact and are engaged with the disk cartridge which is being inserted with certainty. The first and second open/close sliders are pivoted such that the distance between the first and second engageable portions thereof is larger than the distance between the pair of guide walls when the disk cartridge is mounted. Therefore, the disk storage portion is opened such that the shutter and disk storage portion are extended beyond the projected area of the disk cartridge in the state where the disk storage portion is closed, and thus a large window can be formed. Accordingly, the disk apparatus is compatible with a disk cartridge having a large head window even with a small external size.

Especially, the disk apparatus according to the present invention is preferably applicable to a disk cartridge including first and second disk storage portions having both the function of a shutter and the function of a housing. Specifically, the first and second disk storage portions can be opened or closed by the structure in which the first and second open/close sliders respectively engaged with the notches of the first disk storage portion are located symmetrically with respect to a plane, which is parallel to the insertion/ejection direction of the disk cartridge and includes the rotation axis of the disk, and are slid in synchronization with the insertion/ejection of the disk cartridge. In addition, by the structure in which a link mechanism formed of the first open/close slider and the first disk storage portion and another link mechanism formed of the second open/close slider and the second disk storage portion are symmetrically located, a significantly stable insertion/ejection operation which guarantees the linear movement of the disk cartridge is realized. The first and second disk storage portions are also held by the first and second open/close sliders with certainty. Therefore, even against vibration, impact or other external disturbances, a stable insertion/ejection operation is realized.

The cartridge open/close mechanism including the first and second open/close sliders is provided in an optimum, efficient manner within an area defined by the maximum width of the disk cartridge in the state where the first and second disk storage portions are opened. This saves the space of the disk apparatus and thus reduces the size of the disk apparatus, and also allows the window through which the head accesses the disk to be enlarged and thus improves the designing flexibility of the head in the disk apparatus.

The first open/close slider and the first disk storage portion form a link mechanism, and the second open/close slider and the second disk storage portion form another link mechanism. Therefore, when the bottom support base member is positioned by a pair of positioning pins provided on the base in the state where the first and second disk storage portions are opened, the rotation support portions for the first and second disk storage portions and the sliding operation of the first and second open/close sliders are restricted. Accordingly, by positioning the bottom support base member with respect to the base, all the elements including the first and second open/close sliders are uniquely positioned by the first and second link mechanisms, and finally automatically set to a state where the first and second disk storage portions are opened. This can reduce the number of positioning elements and improve the positioning reliability. In addition, by directly positioning the first and second open/close sliders by the positioning pins provided on the base, the first and second disk storage portions in an opened state can be positioned with higher precision.

By the structure in which the first and second open/close sliders are engaged with the positioning pins provided on the base, the first and second open/close sliders can be maintained at a predetermined angle even against vibration, impact or other external disturbances. Even under such conditions, the window can be guaranteed to be open over a certain area to prevent the first and second open/close sliders from impinging on the head or disk motor.

The support portion contactable with the bottom surfaces of the first and second disk storage portions having the function of a housing, and seats contactable with the bottom surface of the bottom support base member, are provided on the base for supporting the disk motor. Owing to this structure, the first and second disk storage portions can be positioned in the height direction, and a minimum necessary clearance for rotating the disk can be guaranteed with high precision. Accordingly, the thickness of the disk apparatus can be reduced with no unnecessary space. Since the first and second disk storage portions are held with certainty when being opened, the durability of the disk cartridge is improved when the disk storage portion is opened.

The first and second open/close sliders are provided with a loading spring for loading the sliders in the direction of closing the first and second disk storage portions. Owing to this, when the disk cartridge is inserted by the operator, an appropriate operation load is applied on the disk cartridge, so that the first and second disk storage portions are opened. When the disk cartridge is to be ejected, the disk cartridge is ejected automatically by the loading force of the loading spring, and the first and second can be closed with certainty. Thus, the insertion/ejection operability of the disk cartridge can be uniquely controlled by the loading force of the loading spring. Since it is not necessary to provide a driving source or driving mechanism specifically for the insertion/ejection operation of the disk cartridge, the number of the elements can be significantly reduced, which reduces the weight and the cost of the disk apparatus.

When the first and second disk storage portions have been closed completely, the first and second engageable portions of the first and second open/close sliders contact the stop contact faces of the notches of the first and second disk storage portions. This prevents the disk cartridge from coming off from the disk apparatus when the disk cartridge is automatically ejected by the loading force of the loading spring. When being ejected, the disk cartridge can be removed from the disk apparatus safely with no risk of inadvertent fall.

The width of the insertion opening through which the disk cartridge is inserted, which is defined by the guide walls, is substantially equal to the size of the part having the minimum width of the projected area of the disk cartridge in the direction of the rotation axis of the disk. Owing to this, even when the disk cartridge cannot be ejected by the loading force of the loading spring for some reason and needs to be removed forcibly from outside, the first and second disk storage portions, which have been opened, pass between the guide walls and thus are closed. Therefore, disk cartridge can be smoothly removed. Even in an emergency where the automatic ejection is impossible, the disk cartridge can be forcibly removed safely without damaging the disk inside.

The unlock members are provided in a part of the guide walls. Therefore, the lock members of the disk cartridge can be unlocked at an optimum timing with certainty during the insertion/ejection operation of the disk cartridge. Thus, even during the forcible ejection, the first and second disk storage portions can be locked without destroying the lock members.

In the state where the disk cartridge is mounted, the lock members are not pressed. Therefore, even where the lock members are formed of a resin, the deterioration of the lock members due to creeping is prevented.

The first and second open/close sliders are provided on the holder window side (on the side from which the disk cartridge is inserted) of the disk apparatus. Therefore, the designing flexibility of the head is improved with no risk of the first and second open/close sliders interfering with the head, and the thickness of the disk apparatus is reduced with out the first and second open/close sliders overlapping the head. The cartridge open/close mechanism including the first and second open/close sliders and the slider loading spring is located two-dimensionally below the disk cartridge. Therefore, the space other than the projected area of the disk cartridge in the direction of the rotation axis of the disk can be used effectively. This can improve the degree of designing flexibility, for example, an element for increasing the strength of the cartridge holder or an additional mechanism can be provided in the area other than the projected area of the disk cartridge.

The first and second slider guides engageable with the first and second open/close sliders are provided generally perpendicularly to the insertion/ejection direction of the disk cartridge, or extended in a direction which is neither perpendicular nor parallel to the insertion/ejection direction of the disk cartridge. Owing to this structure, even when the disk cartridge is inserted with the leading end and the trailing end being inverted, the first and second open/close sliders are not slid or substantially slide by the insertion operation. As a result, the insertion of the disk cartridge in such a wrong state is prevented. Since the first and second open/close sliders have such a wrong insertion prevention function, the number of elements can be significantly reduced.

The first and second open/close sliders may be slid in a direction which is not perpendicular to the insertion direction of the disk cartridge and during the insertion operation of the disk cartridge, the first and second engageable portions of the first and second open/close sliders may start to be engaged with the disk cartridge at positions closer to the holder window than the positions at which the first and second engageable portions are located in the state where the disk cartridge is mounted. In this case, the force used for inserting the disk cartridge can be efficiently converted into a force for operating the first and second open/close sliders, which can reduce the force required for the insertion. Since the first and second engageable portions of the first and second open/close sliders are allowed to wait on the holder window side, the ejection distance of the disk cartridge can be increased and thus the operability of removing the disk cartridge from the disk apparatus can be improved.

A disk apparatus according to the present invention is applicable to a disk cartridge enclosing a disk usable for data writing or reading with various storage systems including optical, magnetooptical, and magnetic recording systems. A disk apparatus according to the present invention is especially preferably applicable to a disk cartridge enclosing a small diameter disk.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2006-281083 filed on Oct. 16, 2006 and No. 2007-264739 filed on Oct. 10, 2007, the entire contents of which are hereby incorporated by reference.

What is claimed is:

1. A disk apparatus allowing a disk cartridge enclosing a disk to be mounted thereon, the disk apparatus comprising:
    a cartridge holder for supporting the disk cartridge, the cartridge holder having a holder window for allowing the disk cartridge to be inserted into the cartridge holder from outside and to be ejected from the cartridge holder to outside;
    a pair of guide walls located in the vicinity of the holder window of the cartridge holder for defining a direction in which the disk cartridge is inserted;
    a disk motor for allowing the disk to be mounted thereon and rotating the disk;
    a head for performing at least one of writing data on the disk and reading data from the disk;
    a base for supporting the head and the disk motor;
    first and second slider guides provided in the cartridge holder;
    a first open/close slider having a first engageable portion engageable with a part of the disk cartridge, the first open/close slider being slidable along the first slider guide of the cartridge holder; and
    a second open/close slider having a second engageable portion engageable with a part of the disk cartridge, the second open/close slider being slidable along the second slider guide of the cartridge holder;
    wherein the first and second open/close sliders slide to allow the first engageable portion and the second engageable portion to be engaged with the disk cartridge such that a distance between the first and second engageable portions is smaller than a distance between the pair of guide walls while the disk cartridge is inserted, and such that the distance between the first and second engageable portions is larger than the distance between the pair of guide walls when the disk cartridge is mounted, and thus the first and second open/close sliders form a window in the disk cartridge so as to allow the head to access the disk and allow the disk to be mounted on the disk motor.

2. The disk apparatus of claim 1, wherein the first and second open/close sliders slide in a direction which is neither perpendicular nor parallel to the direction in which the disk cartridge is inserted.

3. The disk apparatus of claim 2, wherein during the insertion operation of the disk cartridge, the first and second engageable portions start to be engaged with the disk cartridge at positions closer to the holder window than positions at which the first and second engageable portions are located in the state where the disk cartridge is mounted.

4. The disk apparatus of claim 1, wherein the first and second open/close sliders slide in a direction perpendicular to the direction in which the disk cartridge is inserted.

5. The disk apparatus of claim 4, wherein:
    the disk cartridge includes first and second disk storage portions each having a space for storing a part of the disk, the first and second disk storage portions storing the entire disk when being joined together, and also includes a support base member for supporting the first and second disk storage portions to be pivotable around pivoting axes thereof; and
    when the disk cartridge is inserted, the first and second disk storage portions are pivoted so as to form the window by engagement of the first and second engageable portions of the first and second open/close sliders with the first and second disk storage portions.

6. The disk apparatus of claim 5, wherein the first and second disk storage portions of the disk cartridge include:
    notches engageable with the corresponding first and second engageable portions of the first and second open/close sliders such that the first and second engageable portions are pivotable; and
    association portions associated with each other to pivot the first and second disk storage portions around the pivoting axes in opposite directions in synchronization.

7. The disk apparatus of claim 6, wherein a direction in which the first and second open/close sliders slide is perpendicular to the pivoting axes of the first and second disk storage portions.

8. The disk apparatus of claim 6, wherein:
while the disk cartridge is inserted or ejected, the first engageable portion and the notch of the first disk storage portion are engaged with each other, so that a first link mechanism is formed of the first disk storage portion connecting two nodes, wherein one of the nodes is the engagement of the first engageable portion and the notch of the first disk storage portion and the other node is the pivoting axis of the first disk storage portion; and the second engageable portion and the notch of the second disk storage portion are engaged with each other, so that a second link mechanism is formed of the second disk storage portion connecting two nodes, wherein one of the nodes is the engagement of the second engageable portion and the notch of the second disk storage portion and the other node is the pivoting axis of the second disk storage portion; and the first and second disk storage portions are rotated around the pivoting axes thereof in opposite directions in synchronization, so that the first and second link mechanisms maintain the direction in which the disk cartridge is inserted and position the disk cartridge while the disk cartridge is inserted or ejected.

9. The disk apparatus of claim 8, wherein the pair of guide walls are provided only in the vicinity of the holder window.

10. The disk apparatus of claim 9, further comprising a positioning member contactable with an outer circumferential surface of the disk in the state where the disk cartridge is mounted, wherein the positioning member and the disk contact each other so as to position the center of the disk with respect to the disk motor.

11. The disk apparatus of claim 10, wherein the first and second open/close sliders have guide faces in the vicinity of the first and second engageable portions, the guide faces contacting bottom surfaces of the first and second disk storage portions while the disk cartridge is inserted or ejected.

12. The disk apparatus of claim 10, wherein the positioning member is provided in the cartridge holder.

13. The disk apparatus of claim 10, wherein the positioning member is provided on the base.

* * * * *